(12) United States Patent
Yamada

(10) Patent No.: US 9,372,254 B2
(45) Date of Patent: Jun. 21, 2016

(54) POSITION ESTIMATION DEVICE, POSITION ESTIMATION METHOD, PROGRAM AND INTEGRATED CIRCUIT

(75) Inventor: Kazunori Yamada, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/342,893

(22) PCT Filed: Sep. 11, 2012

(86) PCT No.: PCT/JP2012/005742
§ 371 (c)(1),
(2), (4) Date: Mar. 5, 2014

(87) PCT Pub. No.: WO2013/065225
PCT Pub. Date: May 10, 2013

(65) Prior Publication Data
US 2014/0213290 A1 Jul. 31, 2014

(30) Foreign Application Priority Data
Oct. 31, 2011 (JP) .................................. 2011-238148

(51) Int. Cl.
*H04W 24/00* (2009.01)
*G01S 5/02* (2010.01)
(Continued)

(52) U.S. Cl.
CPC ............... *G01S 5/0289* (2013.01); *G01S 5/021* (2013.01); *G01S 5/0247* (2013.01); *G01S 5/14* (2013.01); *H04W 64/00* (2013.01)

(58) Field of Classification Search
CPC ......... G01S 5/0289; G01S 5/14; G01S 5/021; G01S 5/0247; G01S 19/49; G01S 5/10; G08B 21/00; H04W 24/00; H04W 64/00; H04W 4/027; H04M 1/7253; H04M 1/72533

USPC ...................................... 455/456.1; 340/686.1
See application file for complete search history.

(56) References Cited

U.S. PATENT DOCUMENTS 6,799,047 B1 * 9/2004 Bahl et al. .................. 455/456.1
7,138,946 B2 * 11/2006 Tamaki ................. G01S 5/0252
342/457

(Continued)

FOREIGN PATENT DOCUMENTS

CN 1570666 1/2005
CN 102149041 8/2011
(Continued)

OTHER PUBLICATIONS

International Search Report issued Nov. 20, 2012 in International Application No. PCT/JP2012/005742.
(Continued)

*Primary Examiner* — Mahendra Patel
(74) *Attorney, Agent, or Firm* — Wenderoth, Lind & Ponack, L.L.P.

(57) ABSTRACT

A position estimation device which includes: a distance estimation unit which estimates, using a receiving strength of a signal received by a wireless terminal from each of a plurality of base stations communicating with the wireless terminal, distance information indicating a distance from the base station to the wireless terminal; a position estimation unit which estimates a first position to be a current position of the wireless terminal using base station information indicating a position of the base station and the estimated distance information; and a correction unit which corrects the distance information based on an acceleration and a direction of the wireless terminal, the estimated first position, and the base station information. The position estimation unit further estimates a second position to be a current position of the wireless terminal using the base station information and the corrected distance information.

16 Claims, 24 Drawing Sheets

(51) Int. Cl.
*G01S 5/14* (2006.01)
*H04W 64/00* (2009.01)

(56) References Cited

U.S. PATENT DOCUMENTS

| | | | |
|---|---|---|---|
| 7,139,562 B2 | 11/2006 | Matsui | |
| 7,257,411 B2 | 8/2007 | Gwon et al. | |
| 7,525,484 B2* | 4/2009 | Dupray | G01S 1/026 342/450 |
| 7,751,829 B2* | 7/2010 | Masuoka | G01S 5/0294 455/41.2 |
| 7,848,769 B2* | 12/2010 | Fuller, Jr. | H04M 11/04 455/404.1 |
| 8,165,150 B2* | 4/2012 | Aweya | G01S 5/14 370/431 |
| 8,214,459 B2 | 7/2012 | Matsubara et al. | |
| 8,351,958 B2 | 1/2013 | Yoshioka | |
| 8,509,819 B2 | 8/2013 | Tanaka et al. | |
| 8,549,109 B2 | 10/2013 | Matsubara et al. | |
| 8,560,012 B2 | 10/2013 | Ohnishi et al. | |
| 8,892,688 B2 | 11/2014 | Matsubara et al. | |
| 2003/0125046 A1* | 7/2003 | Riley | G01S 5/0205 455/456.1 |
| 2004/0121725 A1 | 6/2004 | Matsui | |
| 2004/0203539 A1* | 10/2004 | Benes | H04W 64/00 455/101 |
| 2004/0203904 A1 | 10/2004 | Gwon et al. | |
| 2005/0130677 A1* | 6/2005 | Meunier et al. | 455/456.6 |
| 2007/0002813 A1* | 1/2007 | Tenny | G01S 5/0242 370/338 |
| 2007/0121560 A1* | 5/2007 | Edge | H04W 64/00 370/338 |
| 2008/0299993 A1* | 12/2008 | Gordon | G01S 5/0252 455/456.5 |
| 2009/0081950 A1 | 3/2009 | Matsubara et al. | |
| 2009/0257426 A1* | 10/2009 | Hart | G01S 5/0226 370/350 |
| 2010/0130229 A1* | 5/2010 | Sridhara et al. | 455/456.1 |
| 2010/0135178 A1* | 6/2010 | Aggarwal | G01S 5/0205 370/252 |
| 2010/0304757 A1 | 12/2010 | Yoshioka | |
| 2011/0007901 A1 | 1/2011 | Ikeda et al. | |
| 2011/0294515 A1* | 12/2011 | Chen et al. | 455/456.1 |
| 2011/0312278 A1 | 12/2011 | Matsushita et al. | |
| 2012/0019674 A1 | 1/2012 | Ohnishi et al. | |
| 2012/0246687 A1 | 9/2012 | Matsubara et al. | |
| 2012/0252502 A1 | 10/2012 | Shiotsu et al. | |
| 2012/0309336 A1 | 12/2012 | Tanaka et al. | |
| 2013/0218451 A1 | 8/2013 | Yamada | |
| 2013/0247117 A1 | 9/2013 | Yamada et al. | |
| 2014/0020032 A1 | 1/2014 | Matsubara et al. | |
| 2015/0019970 A1 | 1/2015 | Matsubara et al. | |

FOREIGN PATENT DOCUMENTS

| | | |
|---|---|---|
| JP | 10-084571 | 3/1998 |
| JP | 2001-349742 | 12/2001 |
| JP | 2003-296237 | 10/2003 |
| JP | 2004-048132 | 2/2004 |
| JP | 2004-166193 | 6/2004 |
| JP | 2004-214923 | 7/2004 |
| JP | 2004-215258 | 7/2004 |
| JP | 2004-297334 | 10/2004 |
| JP | 2005-148021 | 6/2005 |
| JP | 2006-099540 | 4/2006 |
| JP | 2006-146753 | 6/2006 |
| JP | 2006-242751 | 9/2006 |
| JP | 2007-43316 | 2/2007 |
| JP | 2007-151012 | 6/2007 |
| JP | 2007-304787 | 11/2007 |
| JP | 2008-241663 | 10/2008 |
| JP | 2008-306667 | 12/2008 |
| JP | 2009-080593 | 4/2009 |
| JP | 2009-109241 | 5/2009 |
| JP | 2009-188799 | 8/2009 |
| JP | 2010-25738 | 2/2010 |
| JP | 2011-179946 | 9/2011 |
| JP | 2012-137296 | 7/2012 |
| JP | 2012-211767 | 11/2012 |
| JP | 2012-251784 | 12/2012 |
| WO | 2006/123413 | 11/2006 |
| WO | 2007/069323 | 6/2007 |
| WO | 2010/007765 | 1/2010 |
| WO | 2012/070250 | 5/2012 |
| WO | 2012/070251 | 5/2012 |

OTHER PUBLICATIONS

Office Action with Search Report mailed Feb. 3, 2015 in corresponding Chinese patent application No. 201280043547.9 (with partial English translation of search report).

* cited by examiner

| Base station ID | Band information | Transmitting strength | Position information | Update time |
|---|---|---|---|---|
| AP-1 | 2.4 G | 15 dBm | X1, Y1, Z1 | 20010202:22:10:05 |
| AP-2 | 5.0 G | 10 dBm | X2, Y2, Z2 | 20020303:23:13:03 |
| AP-3 | 2.4 G | 10 dBm | X3, Y3, Z3 | 20110924:13:51:31 |
| ... | ... | ... | ... | ... |

FIG. 7

| Base station ID | Receiving strength | Distance information |
|---|---|---|
| AP-1 | -49 dBm | 5 |
| AP-2 | -60 dBm | 15 |
| AP-3 | -54 dBm | 10 |
| ⋮ | ⋮ | ⋮ |

| Terminal posture with respect to base station | Correction factor |
|---|---|
| Front | 1.0 |
| Back | 0.95 |
| Right | 0.85 |
| Left | 0.85 |
| Top | 0.75 |
| Bottom | 0.7 |

FIG. 11

| Human body interference | Correction factor (Frequency 2.4 G) | Distance information (Frequency 5 G) |
|---|---|---|
| Present | 0.8 | 0.7 |

FIG. 16

| Base station ID | Provisional position information | Position information of base station | Direction of base station | Terminal posture | | Terminal posture with respect to base station |
|---|---|---|---|---|---|---|
| | | | | Gravity | North | |
| AP-1 | | X1, Y1, Z1 | North | Bottom | Front | Front |
| AP-2 | X4, Y4, Z4 | X2, Y2, Z2 | South | | | Back |
| AP-3 | | X3, Y3, Z3 | East | | | Right |
| ... | | ... | | | | ... |

| Base station ID | Placement information | Traveling direction | Direction of base station | Human body interference |
|---|---|---|---|---|
| AP-1 | Breast pocket | South | North | Not present |
| AP-2 | | | South | Present |
| AP-3 | | | East | Not present |
| ... | | | ... | ... |

1700

POSITION ESTIMATION DEVICE, POSITION ESTIMATION METHOD, PROGRAM AND INTEGRATED CIRCUIT

TECHNICAL FIELD

The present invention relates to a technique for estimating a position of a wireless terminal.

BACKGROUND ART

In recent years, introduction of home energy management system (HEMS) is progressing in which various home electronic devices are connected to a home network to manage the home electronic devices using information technology (IT), in order to manage a power consumption amount in response to environmental concerns, for example.

HEMS requires an accurate indoor position measurement technique to perform control such as switching ON/OFF the power sources of the home electronic devices according to a position of a user who uses the system.

The indoor position measurement technique includes a method for estimating a distance of a wireless terminal from a base station using characteristics, that is a receiving strength of a radio wave attenuates according to the distance from the base station as shown in FIG. 2, and then estimating an intersection point with a circle having a radius of the estimated distance and about a center of each base station as shown in FIG. 3.

There is also a technique to create an electric field strength map in which the electric field strength at each point is registered in advance and use it as user navigation (see Patent Literature (PTL) 1, for example).

CITATION LIST

Patent Literature

[PTL 1] Japanese Unexamined Patent Application Publication No. 2008-241663

SUMMARY OF INVENTION

Technical Problem

However, many wireless terminals have a problem that the receiving electric field strength of the signal transmitted from the base station varies depending on the terminal posture with respect to the base station due to an influence of antenna arrangement or antenna directivity in the wireless terminal.

The present invention has been conceived in view of the above problem, and has an object to provide a position estimation device which estimates the position of the wireless terminal accurately.

Solution to Problem

In order to solve the above problem, a position estimation device according to the present invention is a position estimation device which estimates a current position of a wireless terminal, the device including: a distance estimation unit configured to estimate, using a receiving strength of a signal received by the wireless terminal from each of a plurality of base stations communicating with the wireless terminal, distance information indicating a distance from the base station to the wireless terminal; a position estimation unit configured to estimate a first position to be a current position of the wireless terminal using base station information indicating a position of the base station and the estimated distance information; and a correction unit configured to correct the distance information based on an acceleration and a direction of the wireless terminal at the estimated first position, the estimated first position, and the base station information, wherein the position estimation unit is further configured to estimate a second position to be a current position of the wireless terminal using the base station information and the corrected distance information.

It is to be noted that general or specific aspects of the above may be realized by a system, a method, an integrated circuit, a computer program, or a computer-readable recording medium such as a CD-ROM, and an arbitrary combination of a system, a method, an integrated circuit, a computer program, and a recording medium.

Advantageous Effects of Invention

With the present invention, a position estimation device is provided which estimates the position of the wireless terminal accurately.

BRIEF DESCRIPTION OF DRAWINGS

FIG. 7 is a diagram showing an example of a measured receiving strength and estimated distance information according to Embodiment 1.

FIG. 9 is a diagram showing an example of correspondence between a terminal posture and a correction factor according to Embodiment 1.

FIG. 11 is a diagram showing an example of correspondence between a positional relationship of a base station, a wireless terminal, and a user and a correction factor according to Embodiment 1.

FIG. 16 is a diagram showing an example of a calculation result of a direction of a base station from a wireless terminal according to Embodiment 1.

FIG. 17 is a diagram showing an example of a determination result of whether or not a user is present between a base station and a wireless terminal according to Embodiment 1.

DESCRIPTION OF EMBODIMENTS

Figure 1:
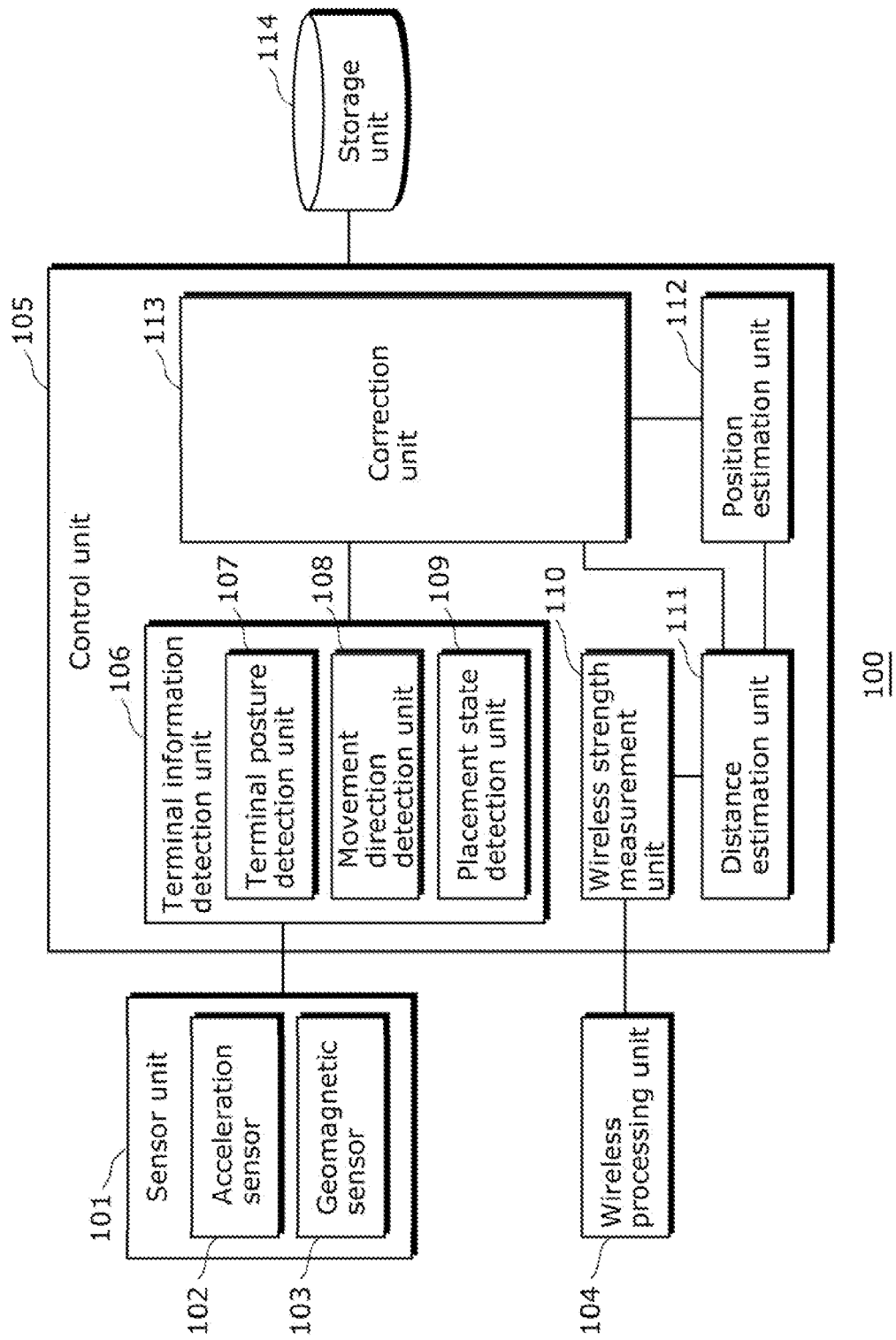
FIG. 1 is a block diagram showing a structure of a position estimation device according to Embodiment 1.
Figure 2:
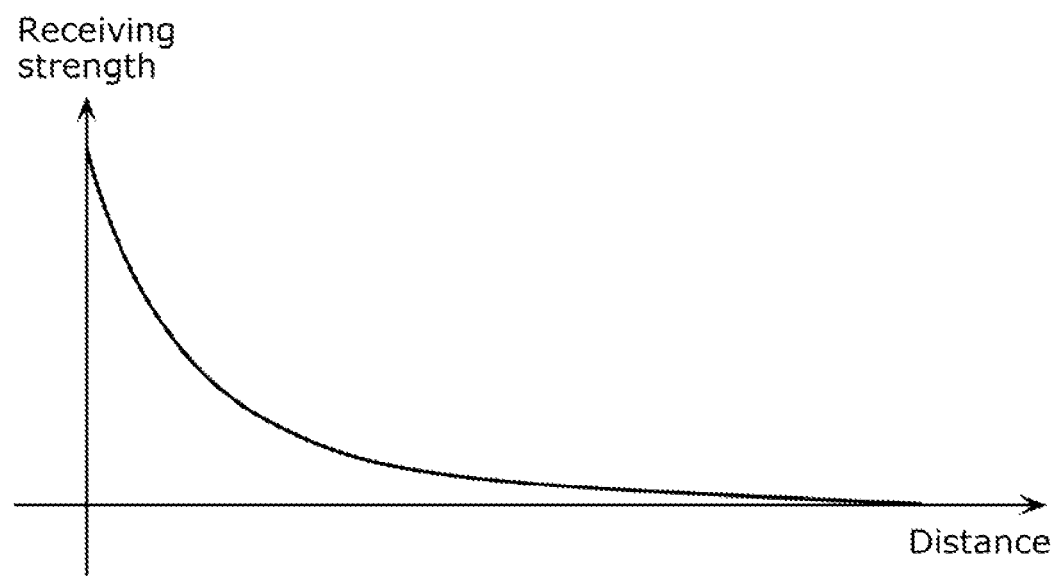
FIG. 2 is a diagram showing an example of a graph of a relationship between an electric field strength and a distance.

In order to achieve the above object, the position estimation device according to a first aspect of the present invention is a position estimation device which estimates a current position of a wireless terminal, the device including: a distance estimation unit configured to estimate, using a receiving strength of a signal received by the wireless terminal from each of a plurality of base stations communicating with the wireless terminal, distance information indicating a distance from the base station to the wireless terminal; a position estimation unit configured to estimate a first position to be a current position of the wireless terminal using base station information indicating a position of the base station and the estimated distance information; and a correction unit configured to correct the distance information based on an acceleration and a direction of the wireless terminal at the estimated first position, the estimated first position, and the base station information, wherein the position estimation unit is further configured to estimate a second position to be a current position of the wireless terminal using the base station information and the corrected distance information.

With this structure, a position estimation device can be provided which reduces the impact of the received eclectic field intensity of the radio wave according to the terminal posture of the wireless terminal and the positional relationship between the wireless terminal and the user, and estimates the position of the wireless terminal accurately. More specifically, the position estimation device according to the present aspect: calculates the terminal posture of the wireless terminal based on the acceleration information and the direction information; and corrects the distance information based on the terminal posture, is corrected according to the obstacle that attenuates the wireless signal, thereby increasing the accuracy of the distance information between the base station and the wireless terminal. By using the accurate distance information for the position estimation, the position estimation device according to the present aspect can equally improve the accuracy of the estimated position information.

Here, in the first aspect, in a position estimation device according to a second aspect, the position estimation device may be included in the wireless terminal, and may further include a detection unit which detects the acceleration and the direction of the wireless terminal for example.

Furthermore, in one of the first aspect and the second aspect, a position estimation device according to a third aspect may further include a posture detection unit which detects a posture of the wireless terminal using an acceleration and a direction of the wireless terminal, and the correction unit may correct the distance information using the detected posture, the estimated first position, and the base station information for example.

Furthermore, in any one of the first to third aspects, in a position estimation device according to a fourth aspect, when the detected posture, the estimated first position, and the base station information indicate that the posture of the wireless terminal with respect to one of the base stations is other than front, the correction unit may correct a value of the distance information to be greater than when the posture of the wireless terminal with respect to the one of the base stations is front, the distance information being estimated as a distance from the one of the base stations to the wireless terminal for example.

Furthermore, in any one of the first to fourth aspects, the position estimation device according to a fifth aspect may further include a placement state determination unit which determines a placement state indicating where the wireless terminal at the estimated first position is placed on a user using an acceleration of the wireless terminal; and a movement direction determination unit configured to determine a movement direction of the wireless terminal at the estimated first position using the acceleration and a direction of the wireless terminal, and the correction unit may: specify a positional relationship among the base station, the user, and the wireless terminal, using the determined placement state, the determined movement direction, the estimated first position, and the base station information; and correct the distance information according to the specified positional relationship for example.

Here, in the fifth aspect, in a position estimation device according to a sixth aspect, when the specified positional relationship indicates that the user is present between one of the base stations and the wireless terminal, the correction unit may correct a value of the distance information to be greater than when the user is not present between the one of the base stations and the wireless terminal, the distance information being estimated as a distance from the one of the base stations to the wireless terminal for example.

Furthermore, in one of the fifth and sixth aspects, in a position estimation device according to a seventh aspect, when the specified positional relationship indicates that the user is present between one of the base stations and the wireless terminal and that the wireless terminal is placed in a breast pocket of a garment worn by the user, the correction unit may correct a value of the distance information to be greater than when the wireless terminal is in a hand of the user, the distance information being estimated as a distance from another one of the base stations to the wireless terminal for example.

Furthermore, in any one of the first to seventh aspects, in a position estimation device according to an eighth aspect, the correction unit may correct the distance information according to a frequency band used by the base station for communicating with the wireless terminal for example.

Furthermore, in any one of the first to eighth aspects, in a position estimation device according to a ninth aspect, when a distance from the estimated first position to the estimated second position is greater than or equal to a predetermined value, the position estimation device may correct the distance information again using the estimated second position as the estimated first position for example.

Here, in the ninth aspect, in a position estimation device according to a tenth aspect, when the distance from the estimated first position to the estimated second position is greater than or equal to the predetermined value, the correction unit may, using the estimated second position as the estimated first position, correct the distance information based on an acceleration and a direction of the wireless terminal at the estimated first position, the estimated first position, and the base station information, and the position estimation unit may further estimate the estimated second position to be a current position of the wireless terminal using the base station information and the corrected distance information for example.

In order to achieve the above object, a position estimation device according to an eleventh aspect of the present invention is a position estimation device which estimates a current position of a wireless terminal which includes: a storage unit configured to preliminarily store an electric field strength map in which a receiving strength of a signal received by the wireless terminal from each of a plurality of base stations communicating with the wireless terminal is recorded at predetermined space intervals; a measurement unit configured to measure a receiving strength of a signal received by the wireless terminal from the base station; a position estimation unit configured to estimate a first position to be a current position of the wireless terminal and at which the receiving strength is measured, using the receiving strength measured by the measurement unit and the electric field strength map stored in the storage unit; a placement state determination unit configured to determine a placement state indicating where the wireless terminal at the estimated first position is placed on a user using an acceleration of the wireless terminal; a movement direction determination unit configured to determine a movement direction of the wireless terminal at the estimated first position using the acceleration and a direction of the wireless terminal; and a correction unit configured to: specify a positional relationship among the base station, the user, and the wireless terminal, using the determined placement state, the determined movement direction, and the estimated first position; and correct the receiving strength according to the specified positional relationship, wherein the position estimation unit is configured to estimate a second position to be a current position of the wireless terminal, using the corrected receiving strength and the stored electric field strength map.

Here, in the eleventh aspect, in a position estimation device according to a twelfth aspect, the position estimation device may be included in the wireless terminal, and the position estimation device may further include a detection unit configured to detect the acceleration and the direction of the wireless terminal for example.

Furthermore, in one of the eleventh and the twelfth aspects, a position estimation device according to a thirteenth aspect may further include a posture detection unit configured to detect a posture of the wireless terminal using the acceleration and the direction of the wireless terminal, wherein the correction unit may be further configured to correct the receiving strength using the detected posture for example.

It is to be noted that general or specific aspects of the above may be realized by a system, a method, an integrated circuit, a computer program, or a computer-readable recording medium such as a CD-ROM, and an arbitrary combination of a system, a method, an integrated circuit, a computer program, and a recording medium.

The following describes the position estimation device according to an aspect of the present invention is described with reference to the Drawings. It is to be noted that each of the embodiments described below is a specific example of the present invention. The numerical values, shapes, constituent elements, the arrangement and connection of the constituent elements, steps, the processing order of the steps etc. shown in the following embodiments are mere examples, and thus do not limit the present invention. Furthermore, out of the constituents in the following embodiments, the constituents not stated in the independent claims describing the broadest concept of the present invention are described as optional constituents.

Embodiment 1

The following describes Embodiment 1 of the present invention with reference to drawings. For example, a position estimation device 100 according to the present invention is included in a wireless terminal such as a mobile phone, and has a function of estimating the current position of the wireless terminal (hereafter referred to as "target terminal").

<1-1. Structure>

FIG. 1 is a block diagram showing a structure of the position estimation device 100 according to Embodiment 1. As shown in FIG. 1, the position estimation device 100 includes a sensor unit 101, a wireless processing unit 104, a control unit 105, and a storage unit 114. The sensor unit 101 includes an acceleration sensor 102 and a geomagnetic sensor 103. The control unit 105 includes a terminal information detection unit 106, a wireless strength measurement unit 110, a distance estimation unit 111, a position estimation unit 112, and a correction unit 113. The terminal information detection unit 106 includes a terminal posture detection unit 107, a movement direction detection unit 108, and a placement state detection unit 109. It is to be noted that the sensor unit 101 is an example of the detection unit, and detects the acceleration and direction of the target terminal.

The acceleration sensor 102 detects acceleration of the target terminal in three axial directions, converts the detected acceleration into an electrical signal, and outputs the electrical signal to the terminal information detection unit 106 as acceleration information.

The geomagnetic sensor 103 detects geomagnetism in the three axial directions, converts the detected geomagnetism into an electrical signal, and outputs the electrical signal to the terminal information detection unit 106 as geomagnetism information.

The wireless processing unit 104 includes an antenna or the like, and has a function to transmit and receive a wireless signal to communicate with a base station. The base station is a device for performing wireless communication with wireless terminals including the target terminal. Examples of the base station include a master station of a mobile phone or a PHS, a wireless LAN access point, and so on.

The terminal posture detection unit 107 calculates, through the use of the acceleration information and the geomagnetism information received from the sensor unit 101, the posture of the target terminal with respect to a gravity direction from the acceleration information, and the posture of the target terminal with respect to a plane rectangular coordinate system from the geomagnetism information. The terminal posture detection unit 107 outputs each calculated posture to the correction unit 113 as terminal posture information of the target terminal.

The movement direction detection unit 108 determines the movement direction of the target terminal based on the acceleration information and the geomagnetism information received from the sensor unit 101, and outputs the movement direction to the correction unit 113 as movement direction information.

The terminal posture detection unit 107 and the movement direction detection unit 108 may use information other than the geomagnetism information from the geomagnetic sensor, such as angular velocity information from an angular velocity sensor, to calculate the direction of the target terminal and calculate the terminal posture information and the movement direction respectively.

As described above, the terminal posture detection unit 107 detects the posture of the target terminal at the estimated first position using the acceleration and direction of the target terminal. The movement direction detection unit 108 is an example of the movement direction determination unit, and determines the movement direction of the target terminal at the estimated first position using the acceleration and direction of the target terminal.

The placement state detection unit 109 detects a placement state indicating at which part of the user the target terminal is placed. The placement state detection unit 109 determines the placement state by performing matching between a pattern of the acceleration information received from the sensor unit 101 and a model pattern of acceleration information in each placement state which is stored in the storage unit 114 beforehand. The placement state detection unit 109 outputs the placement state to the correction unit 113 as placement state information.

As described above, the placement state detection unit 109 is an example of the placement state determination unit, and determines the placement state indicating where the wireless terminal is placed on a user using an acceleration of the wireless terminal.

Figure 4:
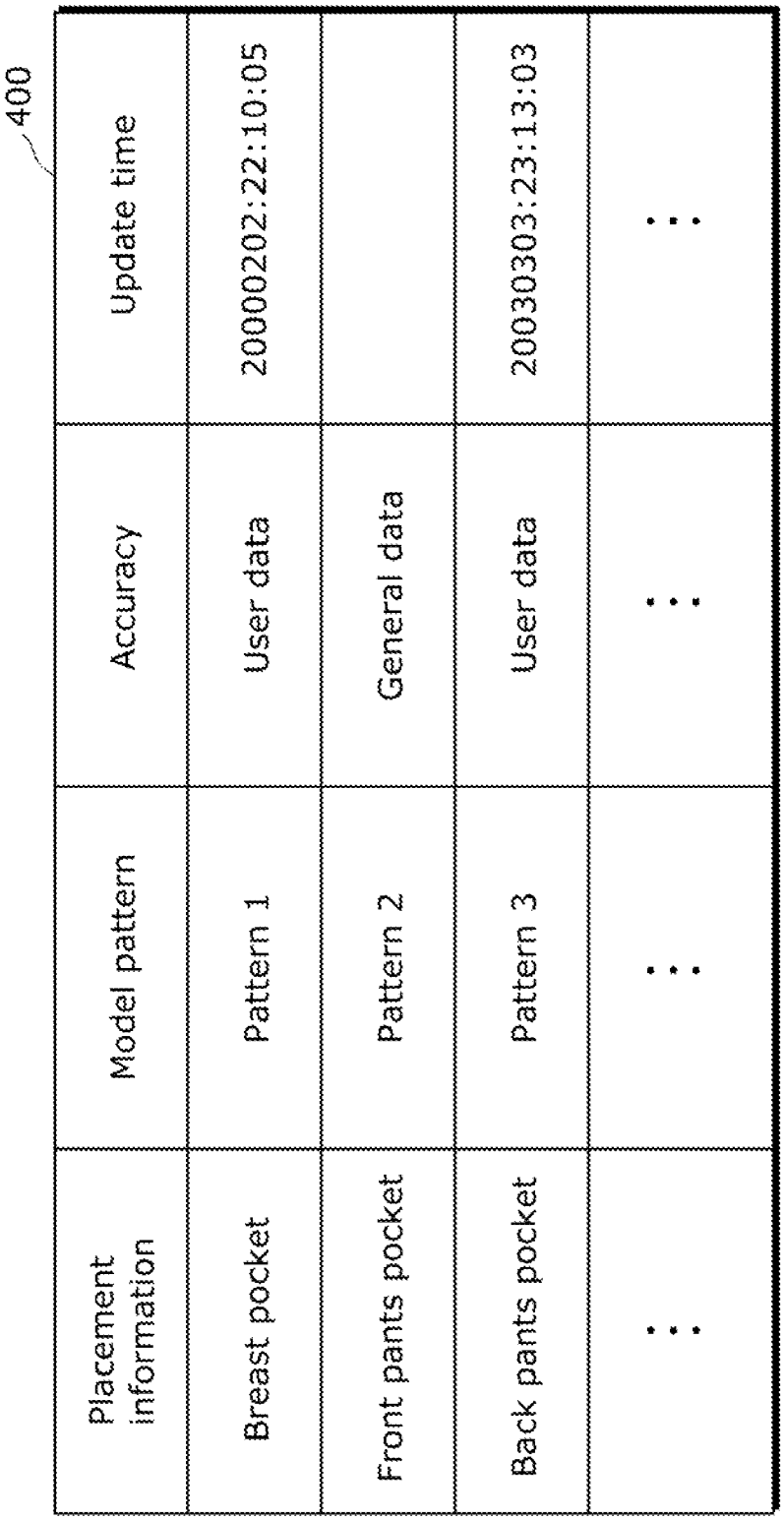
FIG. 4 is a diagram showing an example of a model pattern of acceleration information in each placement state of the wireless terminal according to Embodiment 1.

FIG. 4 is a diagram showing an example of model pattern information 400 in each placement state stored in the storage unit 114.

A model pattern is formed of waveform data of acceleration information. A field of each model pattern holds an address of an area in which actual waveform data is stored. By accessing the storage area indicated by the address, the model pattern of the acceleration information in the corresponding placement state can be obtained.

Accuracy information indicates whether user data (data of the user of the target terminal) or general data is used for the model pattern. The accuracy information indicates the general data in an initial state, and is updated to the user data as a result of obtaining user information by an application of the target terminal or the like. It is possible to calculate the determination accuracy of the placement state according to the accuracy information, and change the amount of correction in the below-mentioned process depending on the determination accuracy. As with the accuracy information, an update time can also be used to evaluate the determination accuracy.

It is to be noted that this embodiment is described with taking the user data as more accurate data than the general data.

Figure 5:
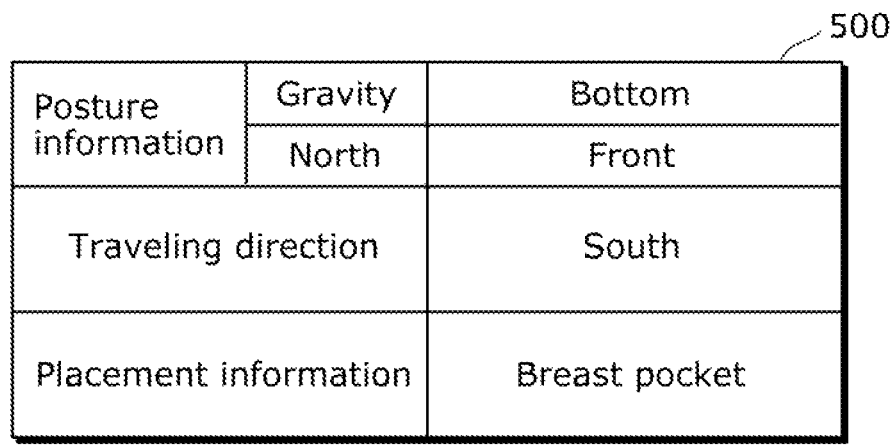
FIG. 5 is a diagram showing a specific example of detected terminal information of the wireless terminal according to Embodiment 1.

FIG. 5 is a diagram showing a specific example of the terminal posture information detected by the terminal posture detection unit 107, the movement direction information detected by the movement direction detection unit 108, and the placement state information detected by the placement state detection unit 109. In the example of the table 500 shown in FIG. 5, the target terminal has its bottom facing in the gravity direction (i.e. facing the ground) and its front facing the north, is placed in the user's breast pocket, and is moving toward the south.

Referring back to FIG. 1, the following continues with the description of each structural element. The wireless strength measurement unit 110 measures a receiving electric field strength of a signal received by the wireless processing unit 104, for each base station. The wireless strength measurement unit 110 outputs the measured receiving electric field strength to the distance estimation unit 111 as receiving strength information associated with a base station ID specifying the base station.

The distance estimation unit 111 estimates a distance between each base station and the target terminal, based on the receiving strength information received from the wireless strength measurement unit 110 and transmitting strength information stored in the storage unit 114 beforehand. The distance estimation unit 111 outputs the estimated distance to the position estimation unit 112 and the correction unit 113, as distance information associated with a base station ID.

As described above, the distance estimation unit 111 estimates, using a receiving electric field strength of a signal received by the wireless terminal from each of the base stations communicating with the wireless terminal, distance information indicating a distance from the base station to the wireless terminal.

It is to be noted that the above-mentioned transmitting strength information is stored in the storage unit 114 together with base station-related data used in the below-mentioned process.

Figure 6:
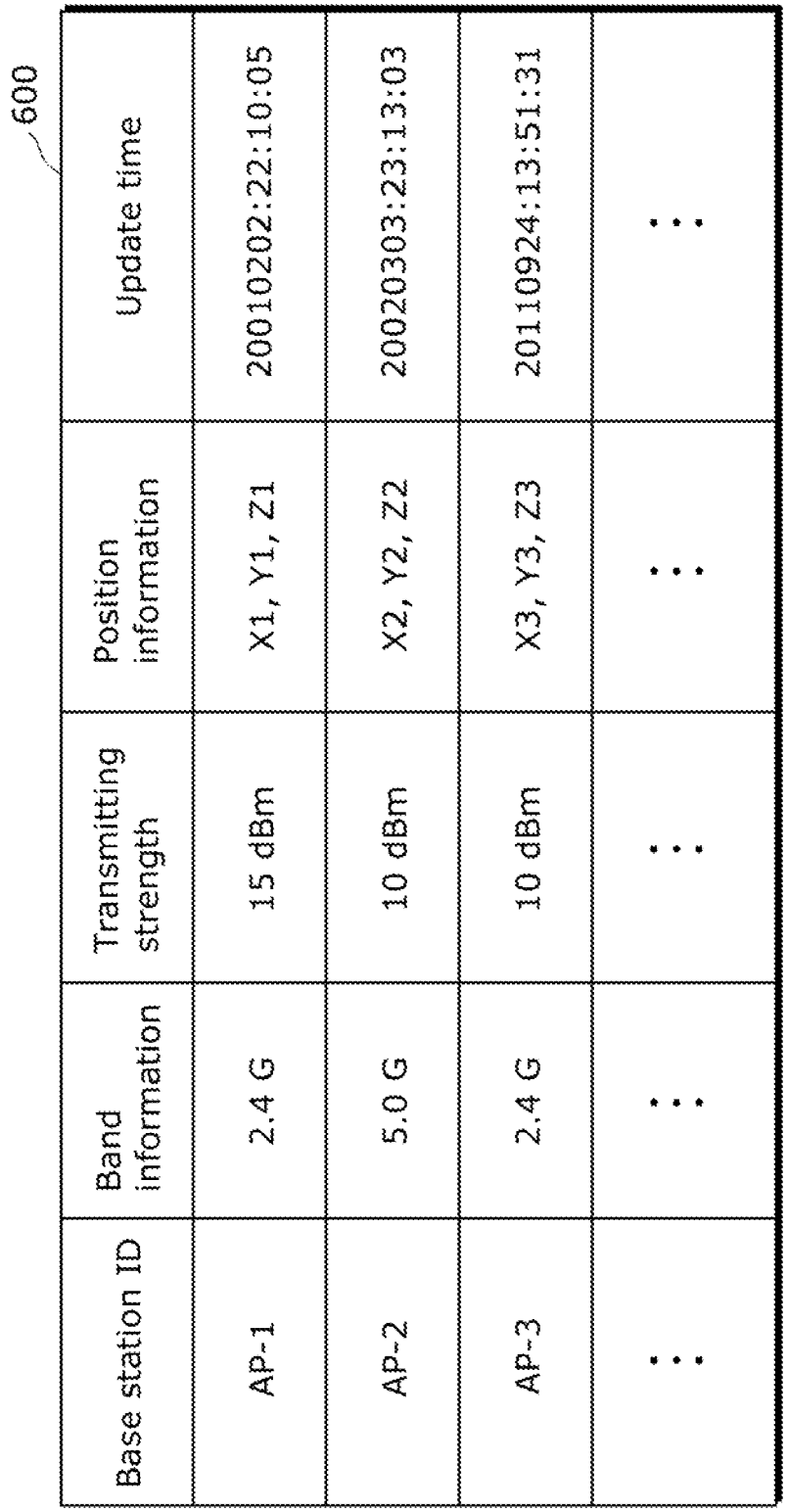
FIG. 6 is a diagram showing an example of base station management information according to Embodiment 1.

FIG. 6 is a diagram showing an example of base station management information 600. The base station management information 600 includes a set of base station ID records. Each base station ID record has items that are band information, transmitting strength, position information, and update time. The base station ID is ID information for uniquely specifying the corresponding base station. The band information indicates a frequency band used by the base station. The transmitting strength indicates radio wave transmission power of the base station. The position information indicates the coordinates (X, Y, and Z axes in a coordinate system) of the base station. The update time is used, for example, for comparison in order to record latest information when updating the base station management information 600.

FIG. 7 is a diagram showing a specific example of the receiving strength information measured by the wireless strength measurement unit 110 and the distance information estimated by the distance estimation unit 111. In the example shown in table 700 in FIG. 7, the receiving electric field strengths of signals transmitted from base stations of base station IDs "AP-1", "AP-2", and "AP-3" are respectively "−49 dBm", "−60 dBm", and "−54 dBm", and the estimated distances are respectively "5 m", "15 m", and "10 m".

Referring back to FIG. 1, the following continues with the description of each structural element. The position estimation unit 112 estimates the position (X, Y, and Z axes) of the target terminal, based on the base station position information stored in the storage unit 114 and the distance information received from the distance estimation unit 111. The position estimation unit 112 outputs the estimated approximate current position (provisional current position) of the target terminal to the correction unit 113 as a first position (hereinafter also refereed to as a provisional current position).

The position estimation unit 112 also has a function of estimating the current position of the target terminal based on corrected distance information received from the correction unit 113 described later and the base station position information.

Once the position information of at least three base stations and the distances from these base stations are obtained, the position estimation unit 112 can estimate the position of the target terminal.

As described above, the position estimation unit 112 estimates a first position to be a current position of the wireless terminal using base station information indicating a position of the base station and the estimated distance information. Furthermore, the position estimation unit 112 further estimates a second position to be a current position of the wireless terminal using the base station information and the corrected distance information.

The correction unit 113 corrects the distance information received from the distance estimation unit 111, based on the terminal posture information, the movement direction information, and the placement state information received from the terminal information detection unit 106, the provisional position information received from the position estimation unit 112, and the above-mentioned base station information. The correction unit 113 outputs the corrected distance information as a result of the correction, to the position estimation unit 112.

As described above, the correction unit 113 corrects the distance information based on an acceleration and a direction of the wireless terminal at the estimated first position, the estimated first position, and the base station information.

As described above, the provisional position information corresponds to the first position that is the approximate current position (provisional current position) of the target terminal.

Furthermore when a distance from the estimated first position to the estimated second position is greater than or equal to a predetermined value, the correction unit 113 corrects the distance information again using the estimated second position as the estimated first position, which is described later. More specifically, when the distance from the estimated first position to the estimated second position is greater than or equal to the predetermined value, the correction unit 113 corrects, using the estimated second position as the first position, the distance information based on an acceleration and a direction of the wireless terminal at the estimated first position, the estimated first position, and the base station information. At this time, the position estimation unit 112 further estimates the estimated second position to be a current position of the wireless terminal using the base station information and the corrected distance information.

The correction performed by the correction unit 113 on the distance information received from the position estimation unit 112 is described in detail below.

The relationship between the terminal posture with respect to the base station and the receiving sensitivity is described first. The terminal posture is defined by inclination with respect to a horizontal plane of the moving terminal and an orientation of the moving terminal on the horizontal plane. In this embodiment, the terminal posture with respect to the base station is posture information indicating which side of the target terminal faces the base station.

Figure 8:
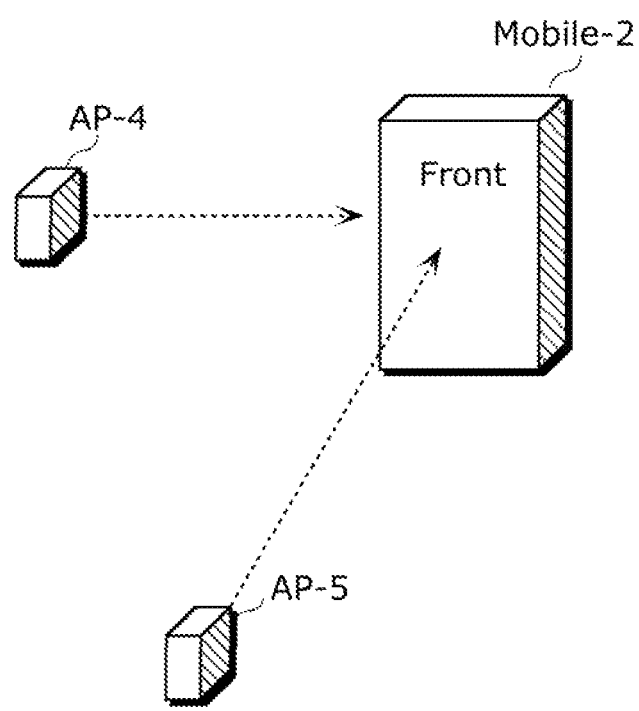
FIG. 8 is a diagram for describing a relationship between a terminal posture and a receiving strength according to Embodiment 1.

FIG. 8 is a diagram for describing the terminal posture with respect to the base station. The following describes the case where the target terminal has such a terminal shape in which the front has a wide area. In most wireless terminals, the receiving electric field strength of the signal transmitted from the base station varies depending on the terminal posture with respect to the base station due to an influence of antenna arrangement or antenna directivity in the wireless terminal, even when the wireless terminal is at the same position, though dependent on the antenna structure in the wireless terminal.

Typically, in the case where the terminal posture of the wireless terminal with respect to the base station is other than "front" as compared with the case where the terminal posture of the wireless terminal with respect to the base station is "front", the receiving electric field strength is measured at a lower level, as a result of which the distance between the base station and the wireless terminal is estimated to be longer.

For example, in an example in FIG. 8, a base station "AP-4" is situated to the right of a wireless terminal "Mobile-2". Furthermore, a base station "AP-5" is situated in front of the wireless terminal "Mobile-2". In other words, even when actually the distance between the base station "AP-4" and the wireless terminal "Mobile-2" and the distance between the base station "AP-5" and the wireless terminal "Mobile-2" are equal and the base station "AP-4" and the base station "AP-5" have the same transmitting strength, the receiving strength of the signal received by the wireless terminal is different, and the base station "AP-4" is estimated to be farther and the base station "AP-5" is estimated to be closer.

The position estimation device 100 according to this embodiment calculates the terminal posture of the target terminal with respect to the base station by the below-mentioned process, and corrects the distance information by referencing to a table 900 exemplified in FIG. 9. The table 900 indicates the terminal posture with respect to the base station and a correction factor corresponding to the terminal posture, and is stored in the storage unit 114 beforehand.

Specifically, the correction unit 113 corrects the distance information using the detected terminal posture, the estimated first position, and the base station information. For example, when the detected posture, the estimated first position, and the base station information indicate that the posture of the wireless terminal with respect to one of the base stations is other than front, the correction unit 113 corrects a value of the distance information to be greater than when the posture of the wireless terminal with respect to the one of the base stations is front, the distance information being estimated as a distance from the one of the base stations to the wireless terminal.

It is to be noted that the values of correction factor shown in FIG. 9 are an example, and the values are not limited to these values.

The relationship between the positional relationship of the base station, the wireless terminal, and the user and the receiving strength is described next.

Figure 10:
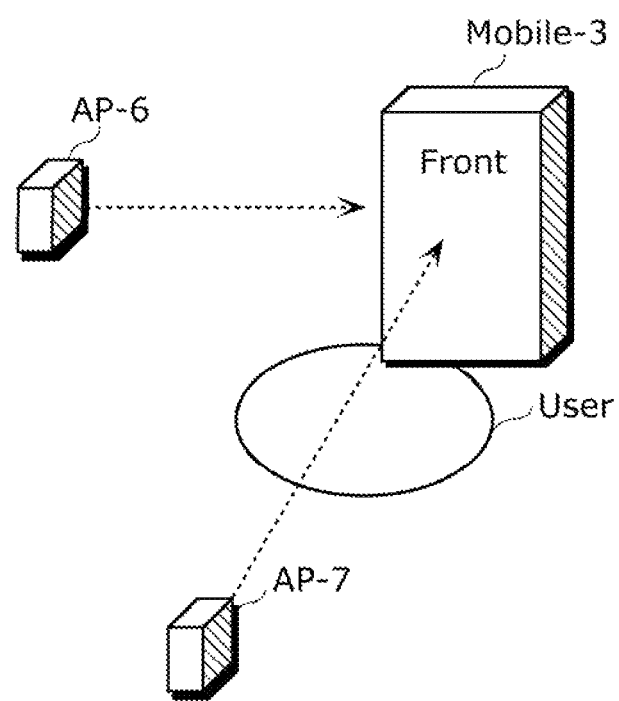
FIG. 10 is a diagram for describing a relationship between a positional relationship of a base station, a wireless terminal, and a user and a receiving strength according to Embodiment 1.

FIG. 10 is a diagram for describing the positional relationship of the base station, the wireless terminal, and the user. In the positional relationship of the base station, the wireless terminal, and the user; if the user (human body) is present between the base station and the wireless terminal, the wireless terminal receives a wireless signal which has been attenuated not only by the distance from the base station but also by the human body interference, and so the receiving electric field strength is measured at a lower level. As a result, the distance between the base station and the wireless terminal is estimated to be longer than the actual distance.

For example, in FIG. 10, a user (human body) is not present between a base station "AP-6" and a wireless terminal "Mobile-3" Furthermore, a user (human body) is present between a base station "AP-7" and the wireless terminal "Mobile-3". Even when actually the distance between the base station "AP-6" and the wireless terminal "Mobile-3" and the distance between the base station "AP-7" and the wireless terminal "Mobile-3" are equal and the base station "AP-6"

and the base station "AP-7" have the same transmitting strength, the receiving strength of the signal received by the wireless terminal is different, and the base station "AP-7" is estimated to be farther than the base station "AP-6".

The influence of the human body interference on the receiving strength varies depending on the frequency band used by the base station. A higher frequency causes an increase in straightness and a decrease in transmittance. Accordingly, the influence of the human body interference is greater when the base station uses a higher frequency band.

The position estimation device 100 according to this embodiment specifies (calculates) the positional relationship of the base station, the target terminal, and the user by the below-mentioned process, and corrects the distance information by referencing to an example that is a table 1100 in FIG. 11. The table 1100 indicates the positional relationship of the base station, the target terminal, and the user and a correction factor corresponding to the positional relationship, and is stored in the storage unit 114 beforehand.

Specifically, the correction unit 113: specifies a positional relationship among the base station, the user, and the wireless terminal, using the determined placement state, the determined movement direction, the estimated first position, and the base station information; and corrects the distance information according to the specified positional relationship. For example, when the specified positional relationship indicates that the user is present between one of the base stations and the wireless terminal, the correction unit 113 corrects a value of the distance information to be greater than when the user is not present between the one of the base stations and the wireless terminal, the distance information being estimated as a distance from the one of the base stations to the wireless terminal.

Note that, even when the positional relationship of the base station, the wireless terminal, and the user is the same, the influence of the human body interference on the receiving strength varies depending on the placement state of the wireless terminal (e.g. whether the wireless terminal is placed in a breast pocket or a pants pocket). Therefore, the influence of the human body interference may be classified into a plurality of levels depending on the positional relationship and the placement state so that the distance information is corrected according to the level.

For example, when the specified positional relationship indicates that the user is present between one of the basestation's and the wireless terminal and that the wireless terminal is placed in a breast pocket of a garment worn by the user, the correction unit 113 corrects a value of the distance information to be greater than when the wireless terminal is in a hand of the user, the distance information being estimated as a distance from another one of the base stations to the wireless terminal.

Referring back to FIG. 1, the storage unit 114 stores the model pattern information 400 of terminal placement state information and the base station management information 600. The storage unit 114 also stores the table 900 in FIG. 9 indicating the correspondence between the terminal posture with respect to the base station and the correction factor, and the table 1100 in FIG. 11 indicating the correspondence between the positional relationship of the base station, the terminal, and the user and the correction factor.

<1-2. Operation>

The following describes operations of the position estimation device 100 according to this embodiment.

Figure 12:
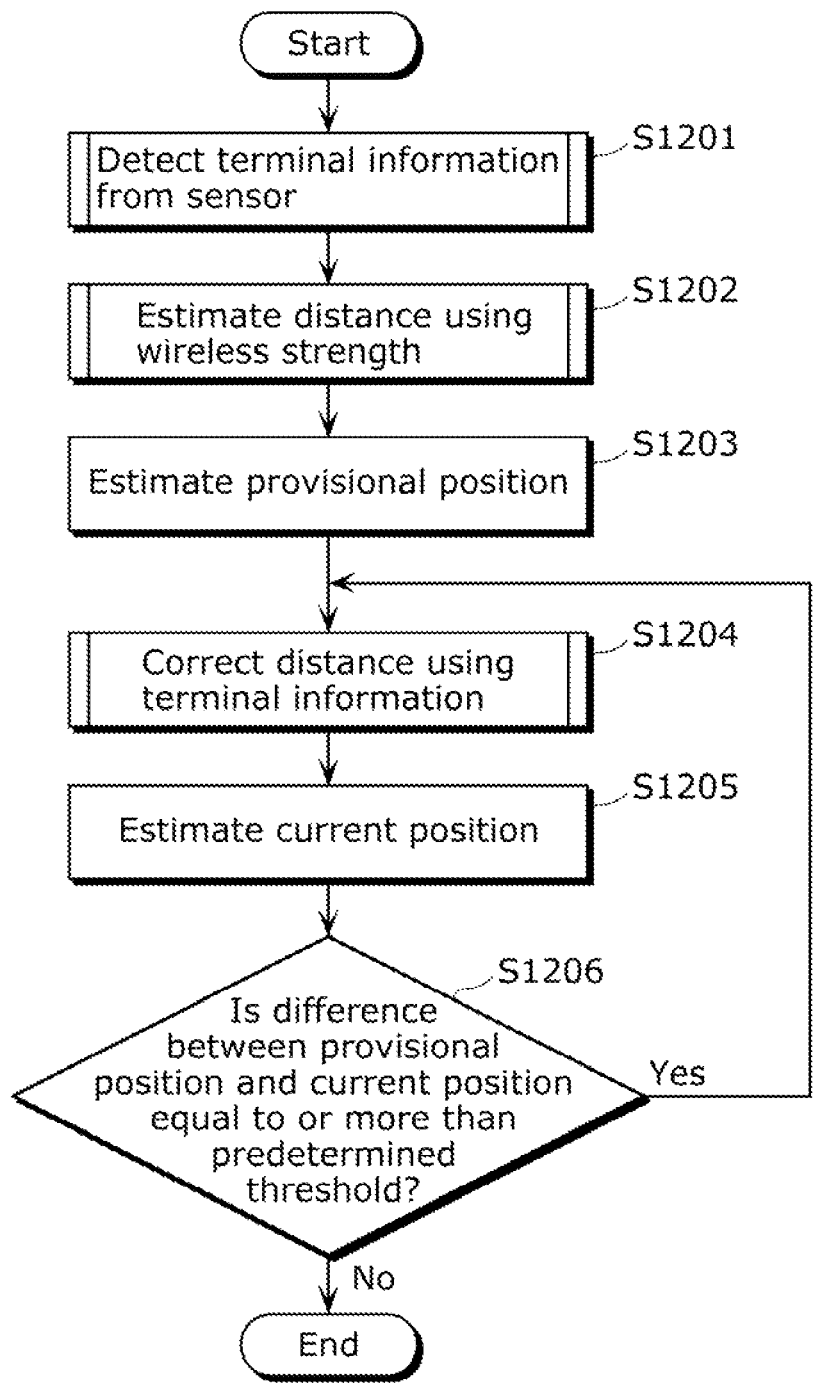
FIG. 12 is a flowchart showing an operation of the position estimation device according to Embodiment 1.

FIG. 12 is a flowchart showing an overall operation of the position estimation device 100 according to this embodiment. As shown in FIG. 12, the operation of the position estimation device 100 includes: a step of obtaining acceleration information and direction information and detecting terminal information (placement state, movement direction, and terminal posture) (S1201); a step of estimating distance information indicating the distance between the base station and the target terminal (S1202); a step of estimating provisional position information indicating the provisional position (first position) of the target terminal (S1203); a step of correcting the distance estimated in S1202 to calculate corrected distance information (S1204); a step of estimating current position information indicating the current position of the target terminal based on the corrected distance information (S1205); and a step of determining whether or not the current position information needs to be re-estimated (S1206).

Figure 13:
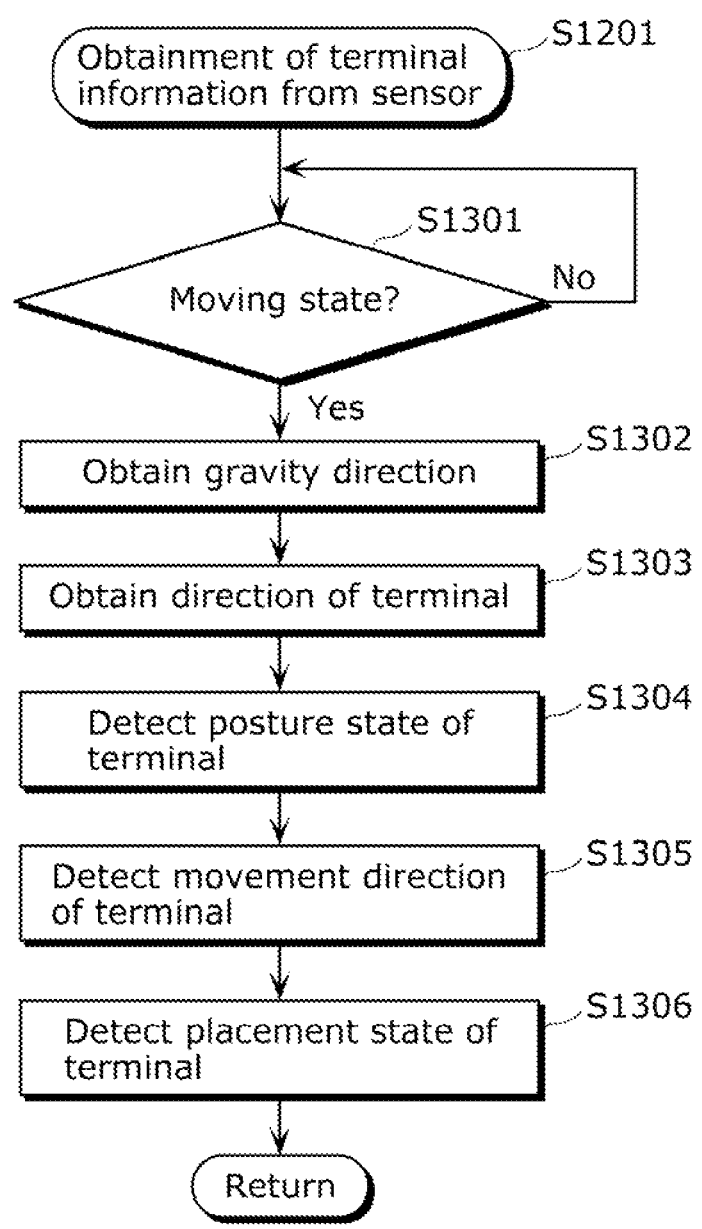
FIG. 13 is a flowchart showing an operation of the position estimation device according to Embodiment 1.

FIG. 13 is a flowchart showing the terminal information detection operation in S1201 in detail. As shown in FIG. 13, the position estimation device 100 first determines whether or not the target terminal is moving from the time of previous position estimation, based on the output of the acceleration sensor 102. In the case where the target terminal is moving, the position estimation device 100 proceeds to the next step (S1301).

In the case where the target terminal is not moving from the previous position estimation, the position estimation device 100 sets the position information estimated at the previous estimation as the current position information, and returns to S1201 and waits for the next estimation.

The terminal posture detection unit 107 calculates the terminal posture information, based on the acceleration information received from the acceleration sensor 102 and the direction information received from the geomagnetic sensor 103 (Steps S1302, S1303, S1304).

The movement direction detection unit 100 detects the movement direction, based on the acceleration information received from the acceleration sensor 102 and the direction information received from the geomagnetic sensor 103 (S1305).

The placement state detection unit 109 detects the placement state, based on the pattern of the acceleration information received from the acceleration sensor 102 and the model pattern of acceleration information in each placement state stored in the storage unit 114 beforehand (S1306).

As a result of the process shown in FIG. 13, the terminal information of the target terminal shown in FIG. 5 is obtained.

Figure 14:
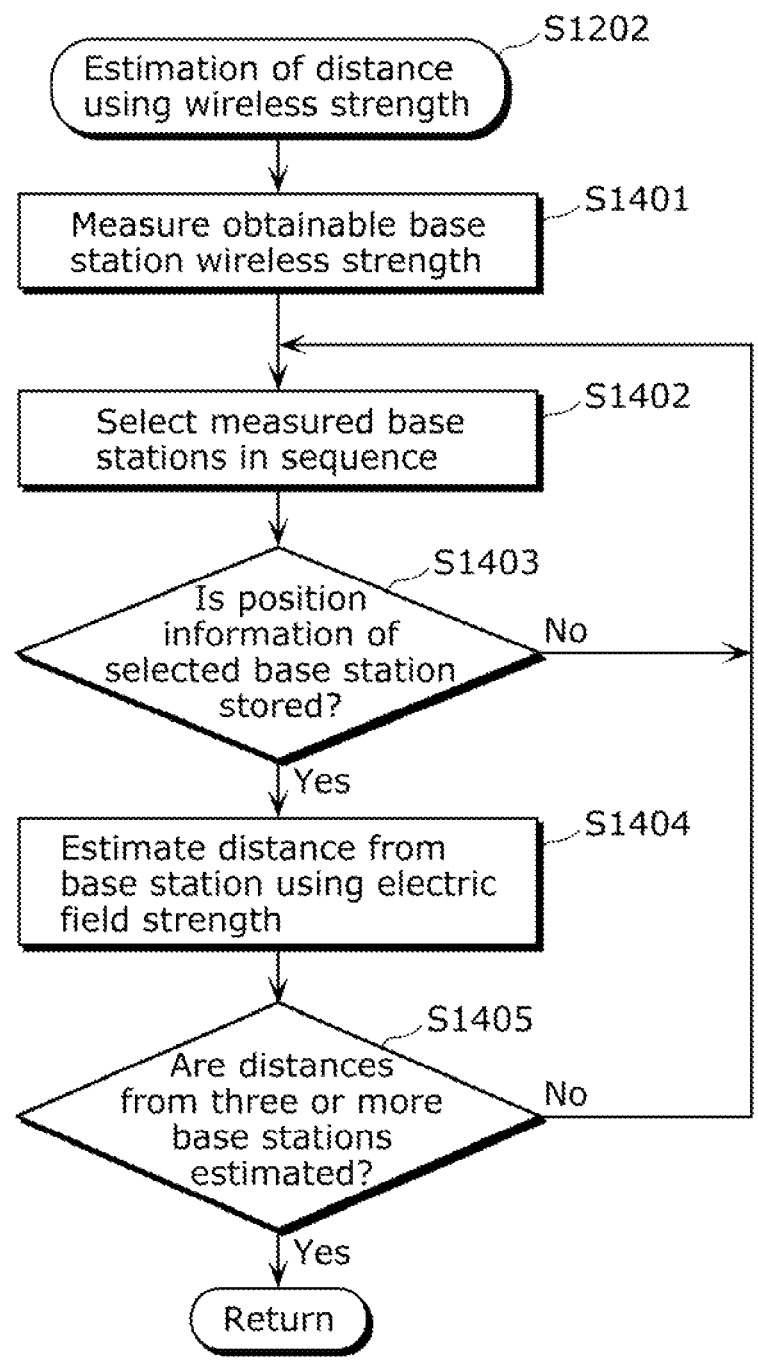
FIG. 14 is a flowchart showing an operation of the position estimation device according to Embodiment 1.

FIG. 14 is a flowchart showing the distance estimation operation in S1202 in detail. As shown in FIG. 14, first the wireless strength measurement unit 110 measures a receiving electric field strength of a signal transmitted from each of a plurality of base stations, and outputs receiving strength information indicating the measured receiving electric field strength in association with a base station ID of the base station, to the distance estimation unit 111 (S1401).

Next, the distance estimation unit 111 selects the base stations measured by the wireless strength measurement unit 110 in sequence, in decreasing order of receiving electric field strength (S1402).

The distance estimation unit 111 determines whether or not base station position information corresponding to a base station ID of the selected base station is stored in the storage unit 114 (S1403). In the case where the position information of the selected base station is stored in the storage unit 114, the position estimation device 100 proceeds to S1404. In the case where the position information of the selected base station is not stored in the storage unit 114, the position estimation device 100 returns to S1402.

The distance estimation unit 111 estimates the distance from the selected base station to the target terminal based on the receiving strength of the signal from the selected base station, and outputs the estimated distance to the position estimation unit 112 and the correction unit 113 in association with the base station ID (S1404).

After S1404, the distance estimation unit 111 determines whether or not the distance information from the necessary number of base stations for estimating the position of the target terminal, i.e. three or more base stations, can be estimated (S1405). In the case where three or more pieces of distance information can be estimated, the position estimation device 100 ends the distance information estimation process, and proceeds to S1203. In the case where three or more pieces of distance information cannot be estimated, the position estimation device 100 returns to S1402.

In the case where three pieces of distance information cannot be estimated even after all base stations measured by the wireless strength measurement unit 110 are selected in S1402, the position information of the target terminal cannot be estimated, and accordingly the position estimation device 100 returns to S1201 and waits for the next position estimation.

As a result of the process shown in FIG. 14, the distance from each base station to the target terminal is estimated.

Figure 3:
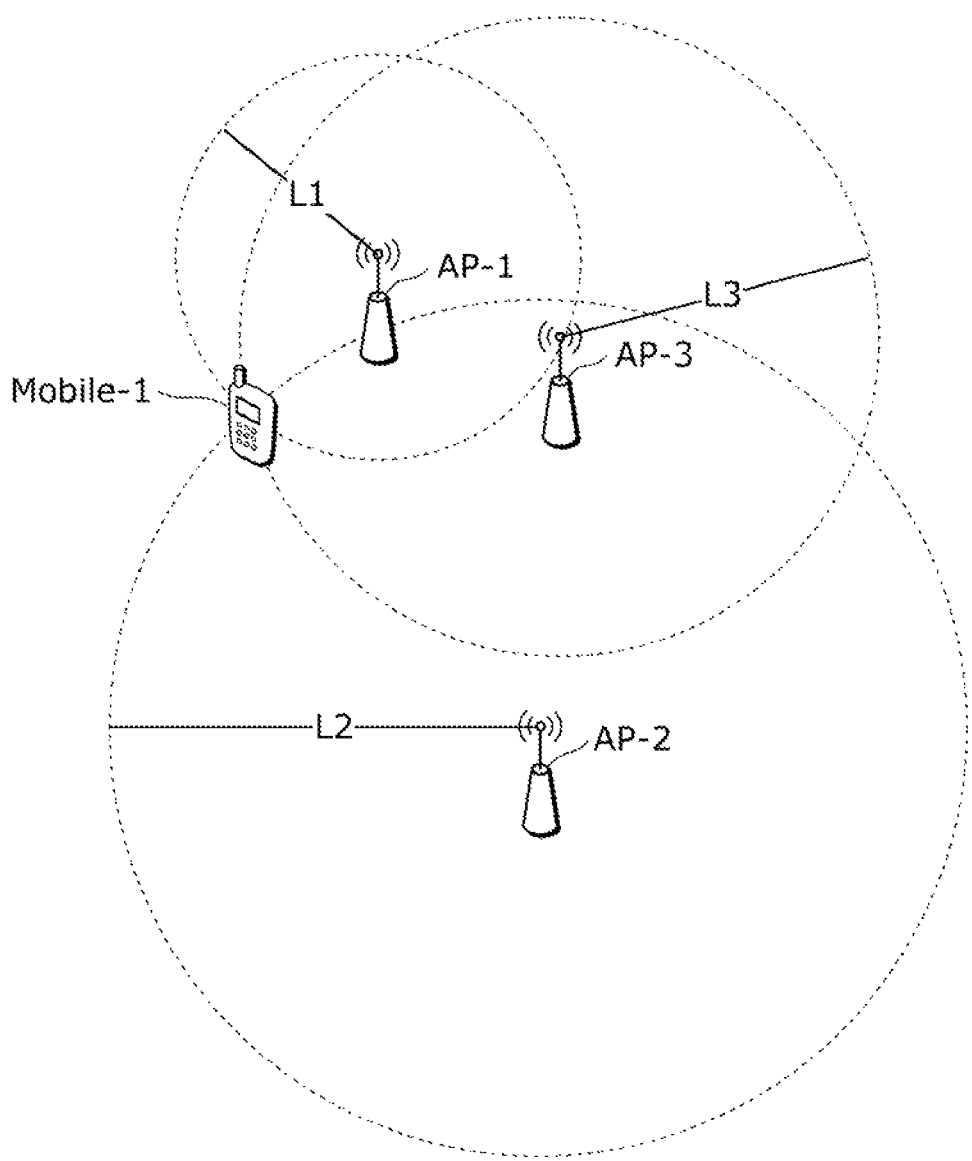
FIG. 3 is a diagram showing an example of a method of estimating a current position of a wireless terminal using distance information.

Referring back to FIG. 12, the process of estimating the provisional position (first position) of the target terminal in S1203 is described below. For example, suppose the receiving strengths of the signals from the three base stations "AP-1", "AP-2", and "AP-3" are measured and the distances from the base stations "AP-1", "AP-2", and "AP-3" to the target terminal are estimated respectively as L1, L2, and L3 in S1202. This being the case, an intersection point of: a circle with radius L1 and center at the base station "AP-1"; a circle with radius L2 and center at the base station "AP-2"; and a circle with radius L3 and center at the base station "AP-3" is estimated as the provisional position of the target terminal as shown in FIG. 3, and provisional position information indicating the provisional position is outputted to the correction unit 113.

Though the above description is based on an assumption that the Z coordinate is the same (fixed), there are two intersection points of the three spherical surfaces when the Z coordinate is taken into consideration. In such a case, the intersection points may be narrowed down to one point by a method such as using the fourth distance information or defining a reference height of the target terminal beforehand.

Figure 15:
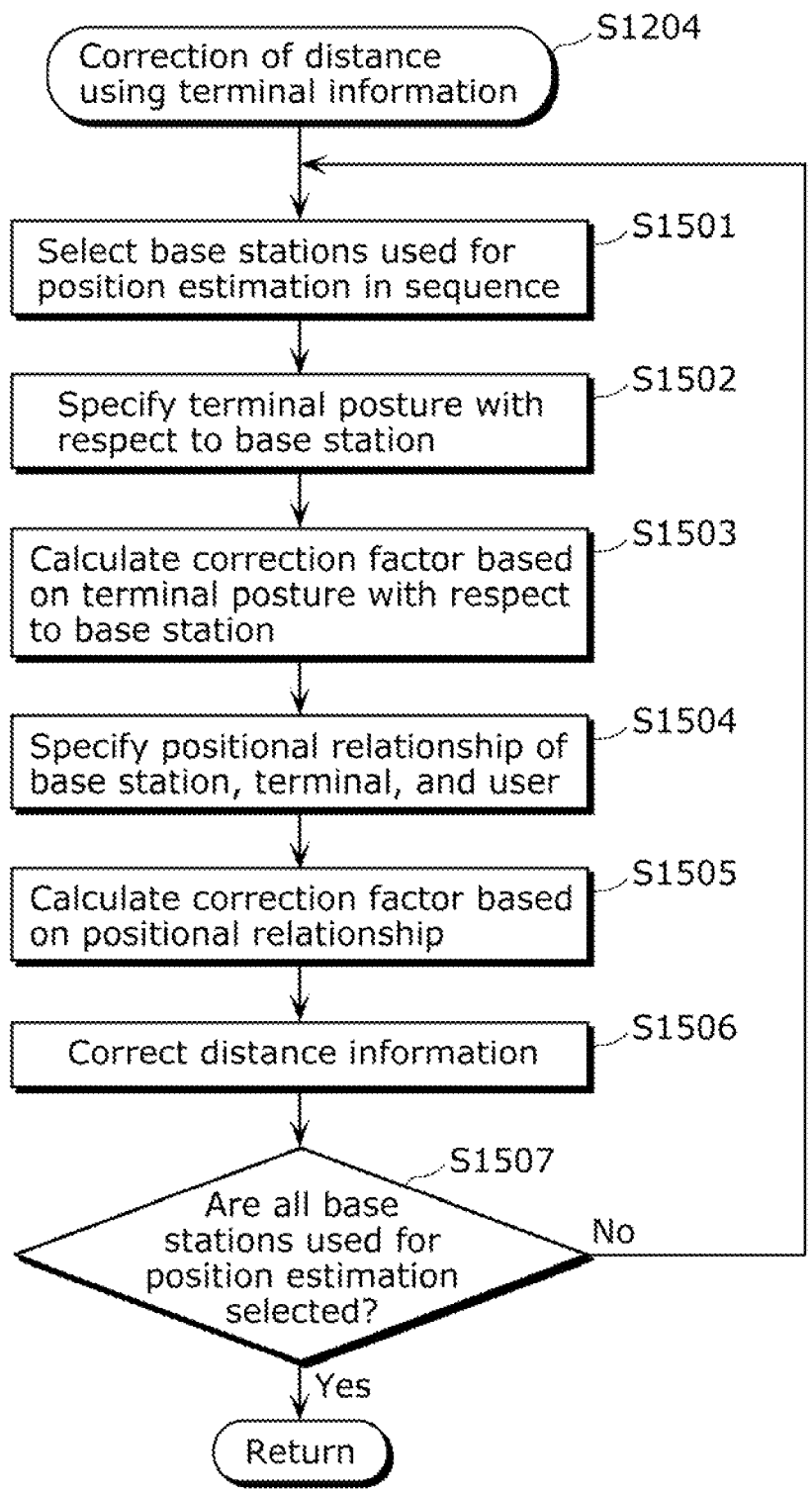
FIG. 15 is a flowchart showing an operation of the position estimation device according to Embodiment 1.

FIG. 15 is a flowchart showing the distance information correction operation in S1204 in detail. First, the correction unit 113 selects the base stations used by the position estimation unit 112 for position estimation, in sequence (S1501).

The correction unit 113 calculates the terminal posture of the target terminal with respect to the base station selected in S1501 (S1502). In this embodiment, the correction unit 113 first calculates the direction from the target terminal to the selected base station, based on the provisional position information received from the position estimation unit 112 and the position information of the base station stored in the storage unit 114.

The correction unit 113 calculates the terminal posture of the target terminal with respect to the selected base station, from the calculated direction from the target terminal to the selected base station and the terminal posture received from the terminal information detection unit 106.

FIG. 16 is a diagram showing an example of the result of calculating the direction from the target terminal to the selected base station and an example of the result of calculating the terminal posture of the target terminal with respect to the base station. In FIG. 16, the directions from the target terminal to the base stations "AP-1", "AP-2", and "AP-3" are respectively calculated as "north", "south", and "east", and the terminal postures of the target terminal with respect to the base stations "AP-1", "AP-2", and "AP-3" are respectively calculated as "front", "back", and "right".

After calculating the terminal posture of the target terminal with respect to the base station, the correction unit 113 calculates the correction factor, by referencing to the table 900 stored in the storage unit 114 and indicating the correspondence between the terminal posture with respect to the base station and the correction factor (S1503).

The correction unit 113 then determines whether or not the user is present between the base station and the target terminal, in the positional relationship of the base station selected in S1541, the target terminal, and the user (S1504).

The process of calculating the positional relationship of the base station, the target terminal, and the user is described below. First, the correction unit 113 determines whether the target terminal is placed on the front side or the back side of the user, from the placement state received from the terminal information detection unit 106. In this embodiment, the correction unit 113 determines that the target terminal is placed on the front side of the user in the case where the placement state is a breast pocket or a front pants pocket, and that the target terminal is placed on the back side of the user in the case where the placement state is a back pants pocket.

Next, the correction unit 113 specifies the direction (facing direction) in which the user faces. Since the movement direction of the target terminal received from the terminal information detection unit 106 indicates the movement direction of the user, the correction unit 113 sets the movement direction of the user as the facing direction of the user in this embodiment.

In the case where the direction from the target terminal to the selected base station calculated in S1502 and the facing direction of the user are the same and the target terminal is placed on the front side of the user, the correction unit 113 determines that the user is present between the base station and the target terminal. Furthermore, in the case where the direction from the target terminal to the selected base station calculated in S1502 and the facing direction of the user are opposite and the target terminal is placed on the back side of the user, the correction unit 113 determines that the user is present between the base station and the target terminal.

FIG. 17 is a diagram showing an example of the result of determining whether or not the user is present between the base station and the target terminal.

In a table 1700 shown in FIG. 17, the user is not present between each of the base stations "AP-1" and "AP-3" and the target terminal, whereas the user is present between the base station "AP-2" and the target terminal.

As mentioned earlier; even when the positional relationship of the base station, the wireless terminal, and the user is the same, the influence of the human body interference on the receiving strength varies depending on the placement state of the wireless terminal. Therefore, a table indicating not the presence/absence of human body interference but the degree of human body interference in a plurality of levels may be created according to the positional relationship and the placement state so that the correction amount is changed depending on the placement state.

In the case where the user is present between the base station and the target terminal, the correction unit 113 calculates the correction factor, by referencing to the table 1100 stored in the storage unit 114 and indicating the correspondence between the positional relationship of the base station, the target terminal and the user and the correction factor (S1505).

After S1505, the correction unit 113 corrects the distance information received from the distance estimation unit 111 by multiplication by the correction factor calculated in S1503 and the correction factor calculated in S1505 (S1506).

The correction unit 113 determines whether or not all base stations used for the position estimation are selected in S1501. In the case where all base stations are selected, the position estimation device 100 proceeds to S1205. Otherwise, the position estimation device 100 returns to S1501 (S1507).

Referring back to FIG. 12, the process in S1205 is described below.

In S1205, the position estimation unit 112 estimates the current position of the target terminal based on the corrected distance information received from the correction unit 113 and the base station position information stored in the storage unit 114. Here, the current position of the target terminal is estimated by performing the same process as S1203 using the corrected distance information instead of the distance information received from the distance estimation unit 111.

Figure 18:
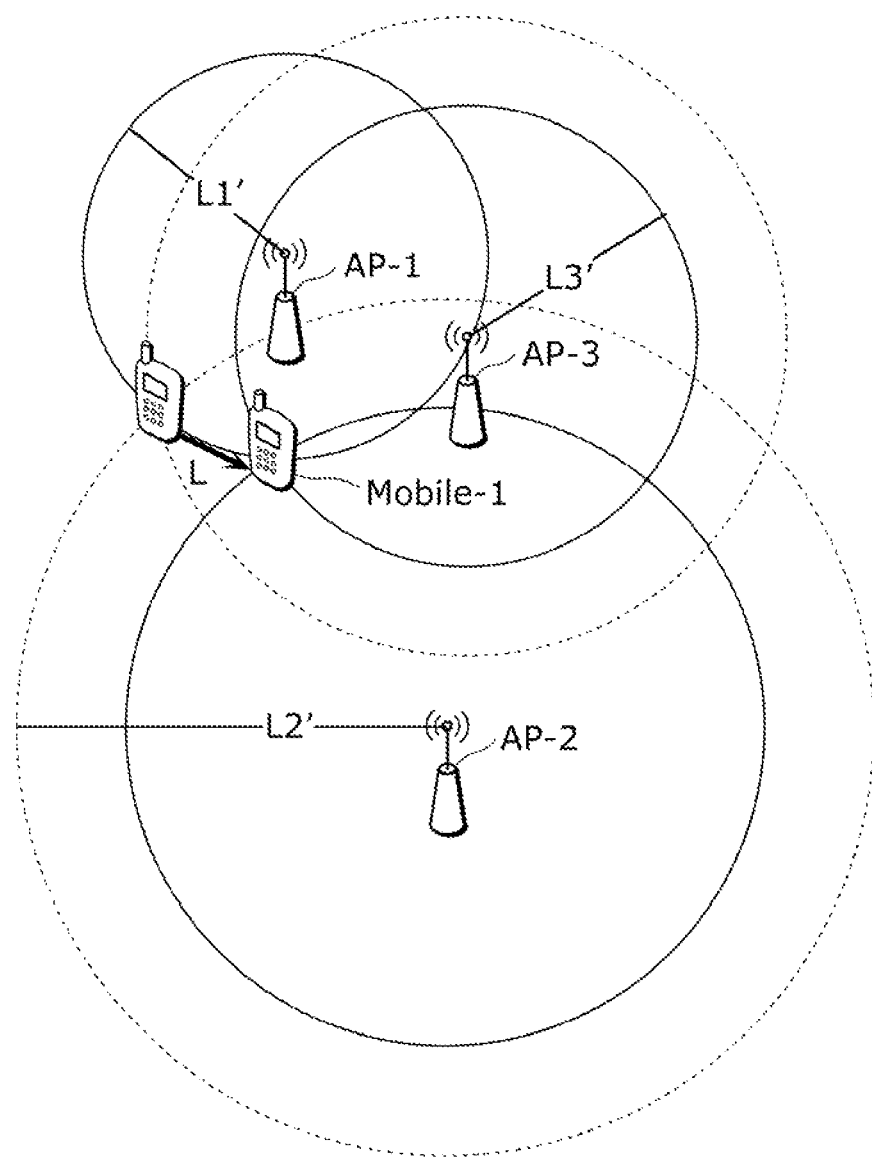
FIG. 18 is a diagram showing a result of estimating a current position using corrected distance information according to Embodiment 1.

FIG. 18 is a diagram showing an example of the current position estimated using the corrected distance information. In FIG. 18, the distances from the base stations "AP-1", "AP-2", and "AP-3" to the target terminal are respectively corrected to L1', L2', and L3' by the correction unit 113, and the current position information is estimated at a position of distance L away from the provisional position of the target terminal estimated in S1203.

In S1206, the position estimation unit 112 determines whether or not the current position information estimated in S1205 needs to be re-estimated. The position estimation unit 112 compares the provisional position information estimated in S1203 and the current position information estimated in S1205. In the case where the distance L between the two positions is equal to or more than a predetermined threshold (e.g. 3 m), the position estimation unit 112 determines that the current position information needs to be re-estimated, sets the current position information estimated in S1205 as provisional position information, and returns to S1204. In the case where the difference of the distance between the two positions is less than the predetermined threshold, the position estimation unit 112 sets the current position information estimated in S1205 as the final position estimation result, and ends the process.

<1-3. Conclusion>

The position estimation device 100 according to this embodiment corrects the distance information estimated from the receiving electric field strength of the signal from each base station, according to the terminal posture of the target terminal with respect to the base station and the positional relationship of the base station, the target terminal, and the user.

With this structure, even in a situation where, due to the influence of the terminal posture or the positional relationship, the receiving electric field strength decreases and so the distance between the base station and the target terminal is estimated to be longer than the actual distance, the distance between the base station and the target terminal can be calculated with higher accuracy, as a result of which the current position of the target terminal can be estimated more accurately.

Embodiment 2

The following describes a position estimation device according to Embodiment 2. In Embodiment 1, the distance between the base station and the target terminal is estimated from the receiving electric field strength of the signal transmitted from the base station, and the current position of the target terminal is estimated using the distance from each base station whose position information is known. Embodiment 2 differs from Embodiment 1 in that the position estimation is performed using an electric field strength map in which the receiving electric field strength of the signal receivable from each base station is recorded at predetermined space intervals. The same components as those in Embodiment 1 are given the same reference signs, and their description is omitted.

<2-1. Structure>

Figure 19:
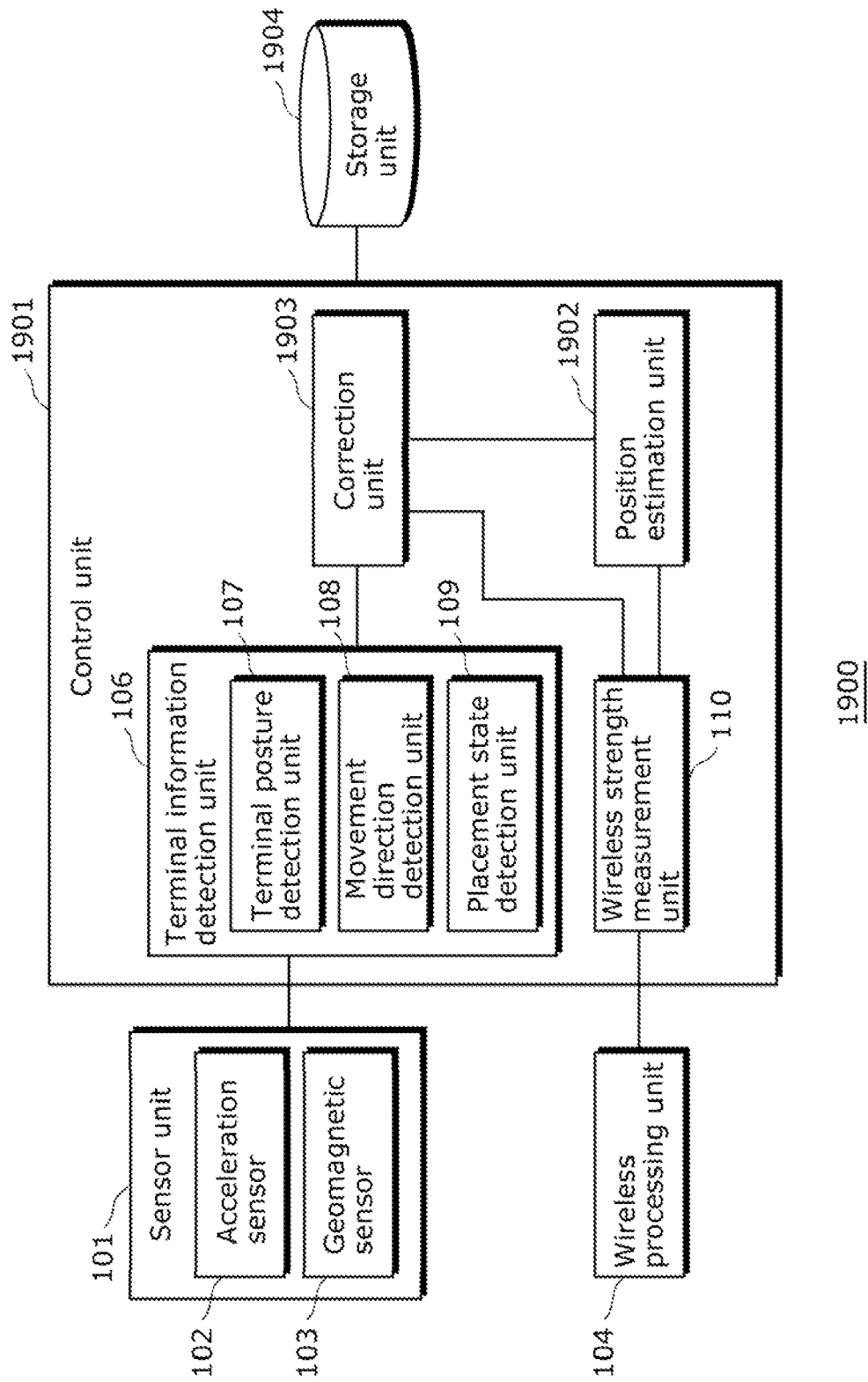
FIG. 19 is a block diagram showing a structure of a position estimation device according to Embodiment 2.

FIG. 19 is a block diagram showing a structure of the position estimation device 1900 according to Embodiment 2. As shown in FIG. 19, the position estimation device 1900 has a structure in which a control unit 1901, a position estimation unit 1902, a correction unit 1903, and a storage unit 1904 are included instead of the control unit 105, the position estimation unit 112, the correction unit 113, and the storage unit 114 and the distance estimation unit 111 is omitted, as compared with the structure of the position estimation device 100 in Embodiment 1.

The position estimation unit 1902 estimates provisional position information indicating the provisional position of the target terminal, using the receiving strength information received from the wireless strength measurement unit 110 and the electric field strength map stored in the storage unit 1904 beforehand. The position estimation unit 112 outputs the estimated provisional position information to the correction unit 1903.

The position estimation unit 112 also has a function of estimating the current position of the target terminal based on corrected strength information received from the correction unit 1903 described later and the electric field strength map.

As described above, the position estimation unit 1902 estimates a first position to be a current position of the wireless terminal and at which the receiving strength is measured, using the receiving strength measured by the wireless strength measurement unit 110 and the electric field strength map stored in the storage unit 1904. Furthermore, the position estimation unit 1902 estimates a second position to be a current position of the wireless terminal, using the corrected receiving strength and the stored electric field strength map. It is to be noted that the first position corresponds to the above-described provisional position, and the first position is also described as a provisional position or provisional position information.

Figure 20:
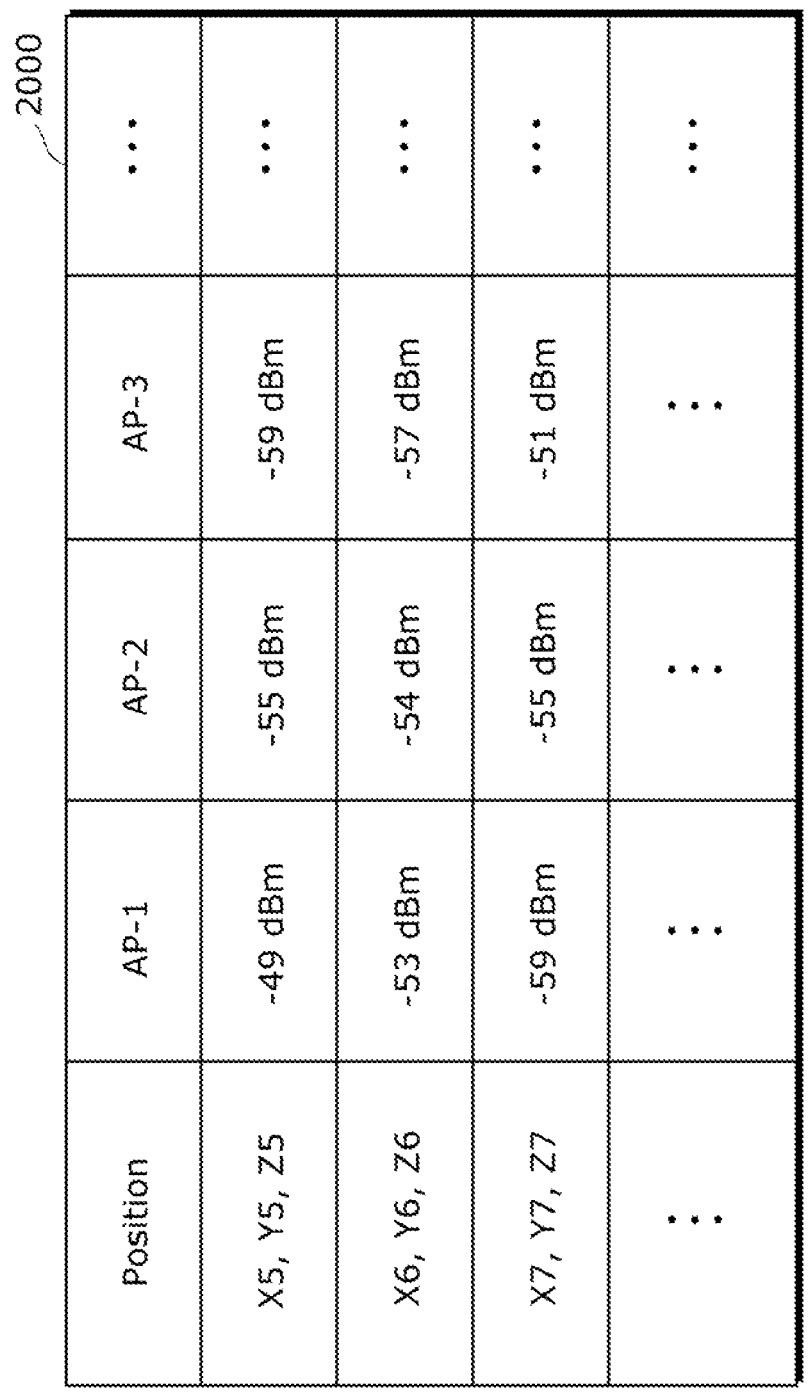
FIG. 20 is a diagram showing an example of an electric field strength map according to Embodiment 2.

FIG. 20 is a diagram showing a specific example of an electric field strength map 2000. As shown in FIG. 20, at predetermined space intervals, the receiving electric field strength of the signal receivable from each base station is recorded in the electric field strength map 2000. The position estimation unit 1902 can refer to the electric field strength map 2000 using the receiving electric field strength of each base station to estimate the current position of the target terminal.

Referring back to FIG. 19, the following continues with the description. The correction unit 1903 corrects the receiving strength information received from the wireless strength measurement unit 110, based on the terminal posture information, the movement direction information, and the placement state information received from the terminal information detection unit 106, the provisional position information received from the position estimation unit 1902, and the base station position information. The correction unit 1903 outputs the corrected strength information as a result of the correction, to the position estimation unit 1902.

Stated differently, the correction unit 1903 specifies a positional relationship among the base station, the user, and the wireless terminal, using the determined placement state, the determined movement direction, and the estimated first position, of the target terminal; and corrects the receiving strength according to the specified positional relationship. While the correction factor is set so as to decrease the distance in Embodiment 1, the correction factor is set so as to increase the receiving strength in this embodiment.

The storage unit 1904 preliminarily stores an electric field strength map in which a receiving strength of a signal received by the wireless terminal from each of the base stations communicating with the wireless terminal is recorded at predetermined space intervals.

Specifically, the storage unit 1904 stores the model pattern information 400 of each placement state in FIG. 4, the base station management information 600 in FIG. 6, and the electric field strength map 2000 in FIG. 20. The storage unit 1904 also stores the table indicating the correspondence between the terminal posture with respect to the base station and the correction factor, and the table indicating the correspondence between the positional relationship of the base station, the terminal, and the user and the correction factor.

<2-2. Operation>

The following describes operations of the position estimation device 1900 according to this embodiment.

Figure 21:
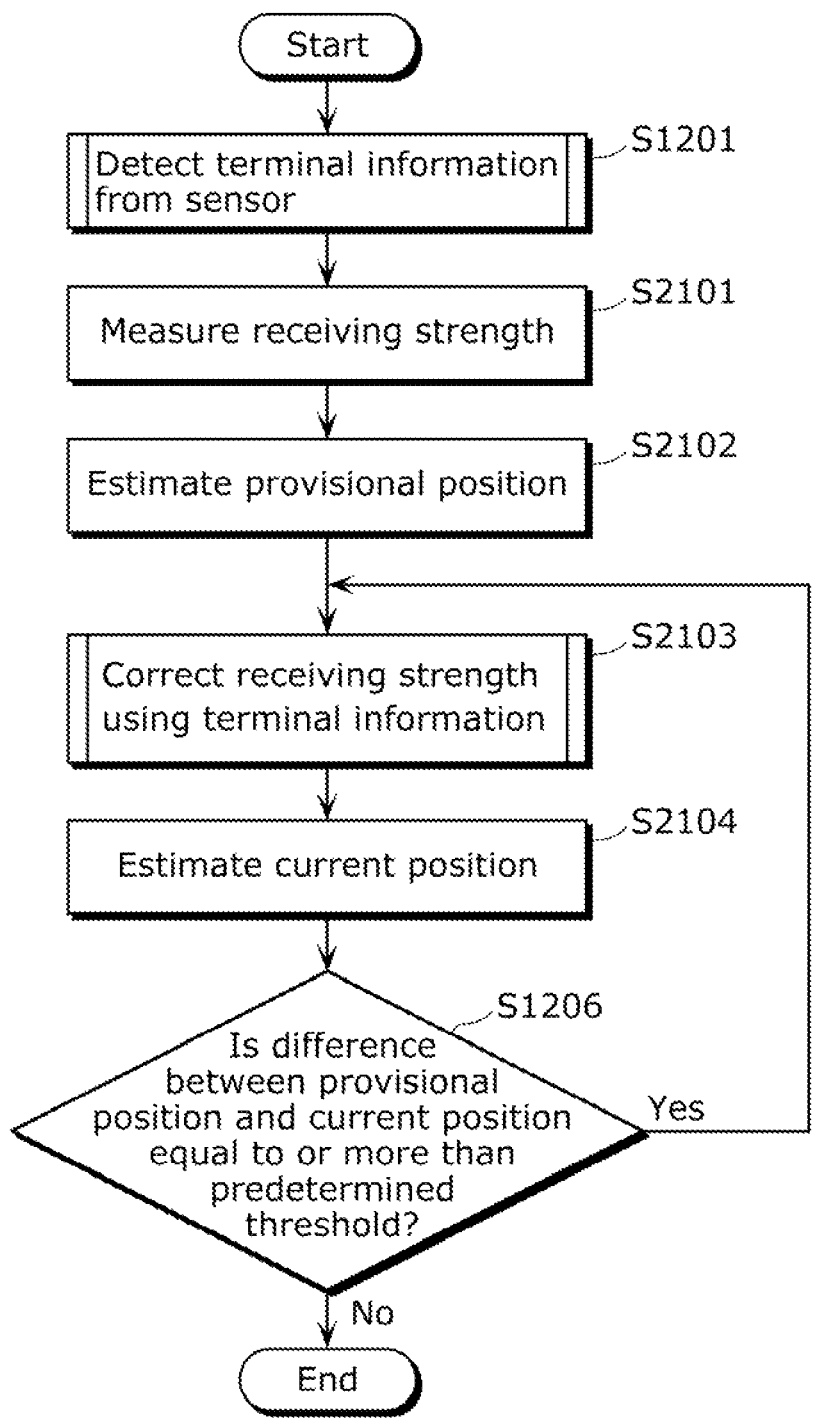
FIG. 21 is a flowchart showing an operation of the position estimation device according to Embodiment 2.

FIG. 21 is a flowchart showing an overall operation of the position estimation device 1900 according to this embodiment.

As shown in FIG. 21, the operation of the position estimation device 1900 includes: a step of obtaining acceleration information and direction information and detecting terminal information (placement state, movement direction, and terminal posture) (S1201); a step of measuring the receiving strength of the signal transmitted from the base station (S2101); a step of estimating provisional position information indicating the provisional position (first position) of the target terminal (S2102); a step of correcting the receiving strength measured in S2101 to calculate corrected strength information (S2103); a step of estimating current position information indicating the current position of the target terminal based on the corrected strength information (S2104); and a step of determining whether or not the current position information needs to be re-estimated (S1206).

S1201 has the same process as in Embodiment 1, and so its description is omitted.

In S2101, the wireless strength measurement unit 110 measures the receiving electric field strength of the signal transmitted from each of a plurality of base stations, and outputs receiving strength information indicating the measured receiving electric field strength in association with a base station ID, to the position estimation unit 1902 and the correction unit 1903.

In S2102, the position estimation unit 1902 estimates provisional position information indicating the provisional position of the target terminal based on the receiving strength information received from the wireless strength measurement unit 110 and the electric field strength map stored in the storage unit 1904, and outputs the provisional position information to the correction unit 1903.

Figure 22:
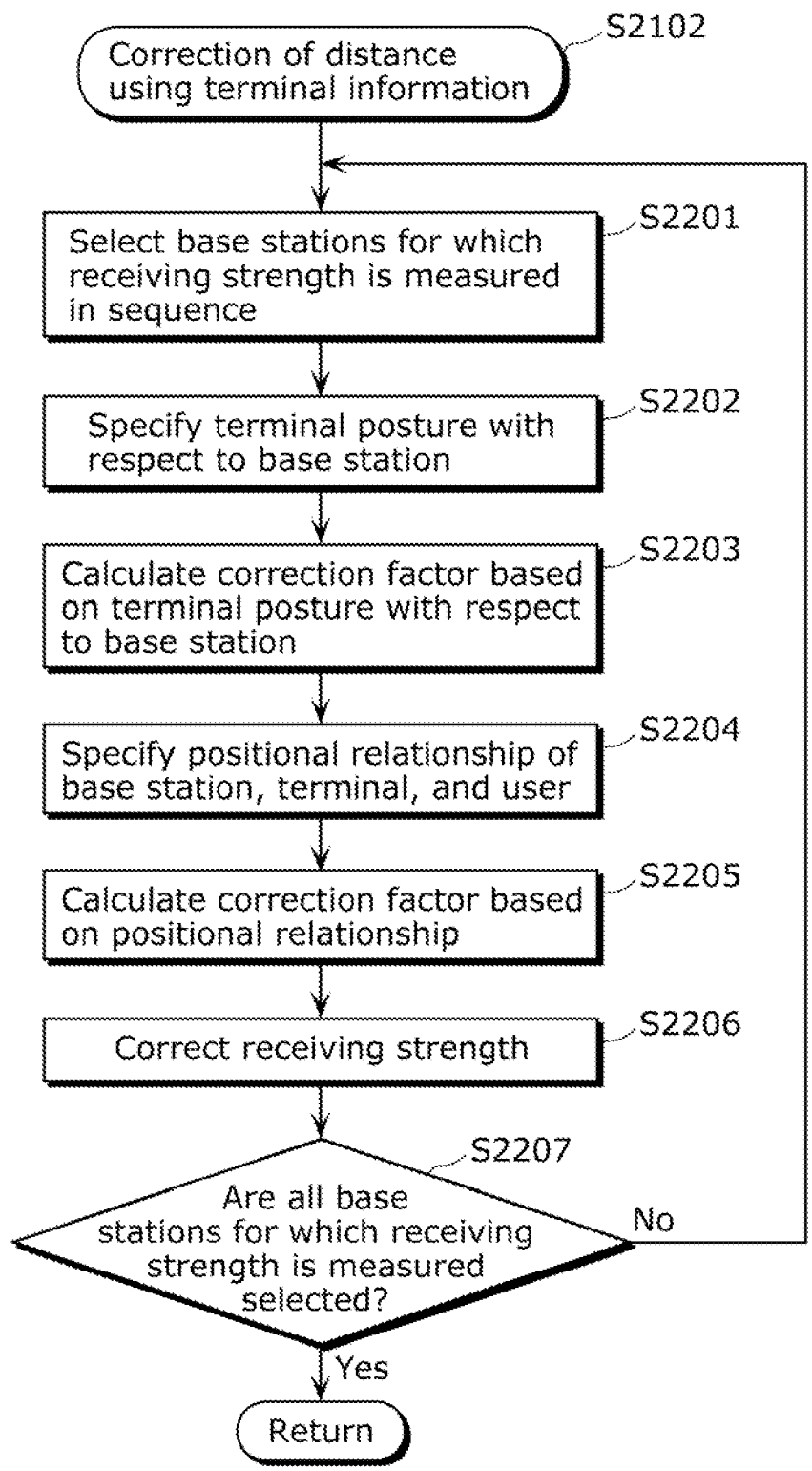
FIG. 22 is a flowchart showing an operation of the position estimation device according to Embodiment 2.

FIG. 22 is a flowchart showing the receiving strength information correction operation in S2103 in detail. First, the correction unit 1903 selects the base stations measured by the wireless strength measurement unit 110, in sequence (S2201).

The correction unit 1903 calculates the terminal posture of the target terminal with respect to the base station selected in S2201 (S2202). The process of calculating the terminal posture of the target terminal with respect to the base station is the same as S1502 in Embodiment 1.

After calculating the terminal posture of the target terminal with respect to the base station, the correction unit 1903 calculates the correction factor, by referencing to the table stored in the storage unit 1904 and indicating the correspondence between the terminal posture with respect to the base station and the correction factor (S2203).

The correction unit 1903 then determines whether or not the user is present between the base station and the target terminal, in the positional relationship of the base station selected in S2201, the target terminal, and the user (S2204). The process of determining whether or not the user is present between the base station and the target terminal in the positional relationship of the base station, the target terminal, and the user is the same as S1504 in Embodiment 1.

In the case where the user is present between the base station and the target terminal, the correction unit 1903 calculates the correction factor, by referencing to the table stored in the storage unit 1904 and indicating the correspondence between the positional relationship of the base station, the target terminal, and the user and the correction factor (S2205).

After S2205, the correction unit 1903 corrects the receiving strength information received from the wireless strength measurement unit 110 by multiplication by the correction factor calculated in S2203 and the correction factor calculated in S2205 (S2206).

The correction unit 1903 determines whether or not all base stations measured by the wireless strength measurement unit 110 are selected. In the case where all base stations are selected, the position estimation device 1900 proceeds to S2104. Otherwise, the position estimation device 1900 returns to S2201 (S2207).

Referring back to FIG. 21, the process in S2104 is described below.

In S2104, the position estimation unit 1902 estimates the current position of the target terminal based on the corrected strength information received from the correction unit 1903 and the electric field strength map stored in the storage unit 114.

In S2105, the position estimation unit 1902 determines whether or not the current position information estimated in S2104 needs to be re-estimated. The position estimation unit 1902 compares the provisional position information estimated in S2102 and the current position information estimated in S2104. In the case where the distance L between the two positions is equal to or more than a predetermined threshold (e.g. 3 m), the position estimation unit 1902 determines that the current position information needs to be re-estimated, sets the current position information estimated in S2104 as provisional position information, and returns to S2103. In the case where the difference of the distance between the two positions is less than the predetermined threshold, the position estimation unit 1902 sets the current position information estimated in S2104 as the final position estimation result, and ends the process.

<2-3. Conclusion>

The position estimation device 1900 according to this embodiment estimates the position of the target terminal by referencing to the electric field strength map using the receiving electric field strength of the signal from each base station.

With this structure, the process required for distance information calculation and the time required for position information calculation can be reduced. This enables position estimation to be performed at high speed, as compared with the position estimation device in Embodiment 1.

(3-1, Supplementary Notes)

Figure 23:
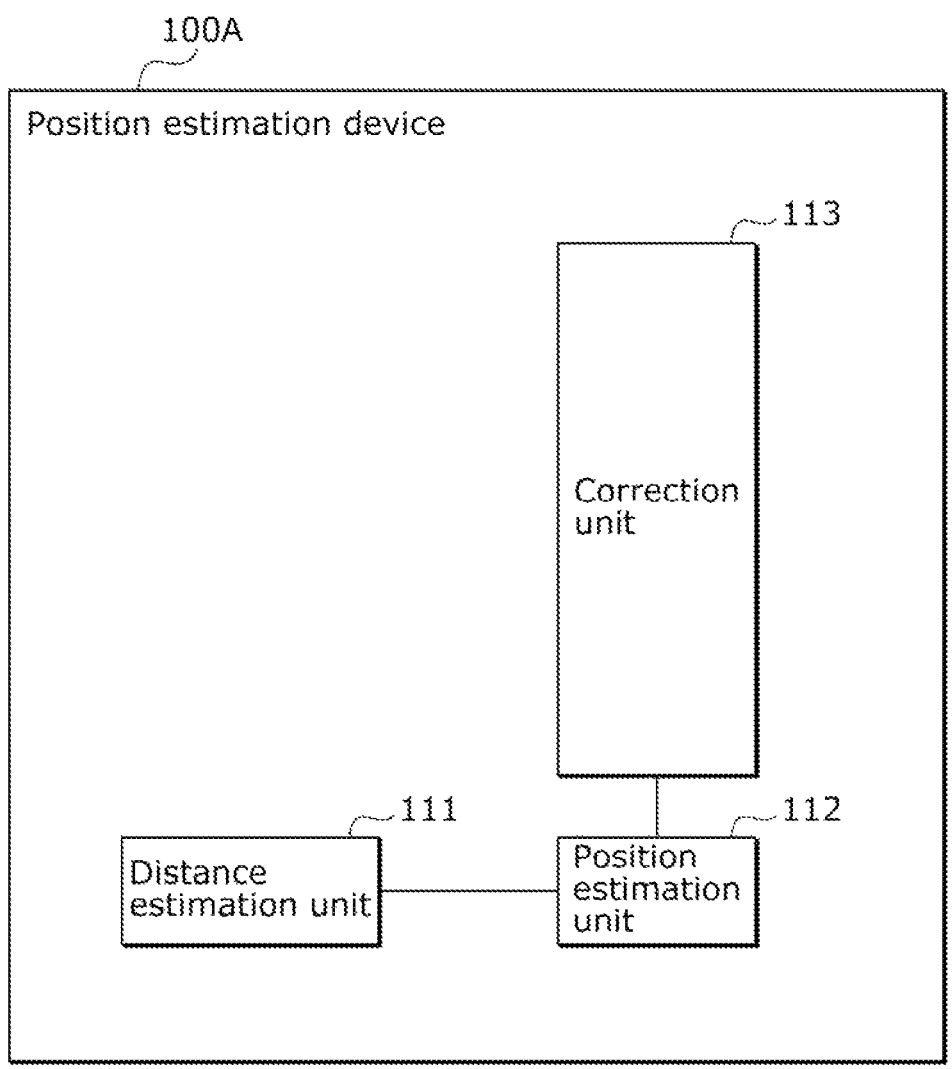
FIG. 23 is a block diagram showing a minimum structure of the position estimation device according to the present invention.

Although the position estimation device 100 and the position estimation device 1900 are raised as a structure example of the position estimation device to describe Embodiment 1 and Embodiment 2, the position estimation device is not limited to these embodiments. As shown in FIG. 23, it is sufficient that the minimum structure of the position estimation device includes the distance estimation unit 111, the position estimation unit 112, and the correction unit 113. Here, FIG. 23 is a block diagram showing a minimum structure of the position estimation device according to the present invention.

Figure 24:
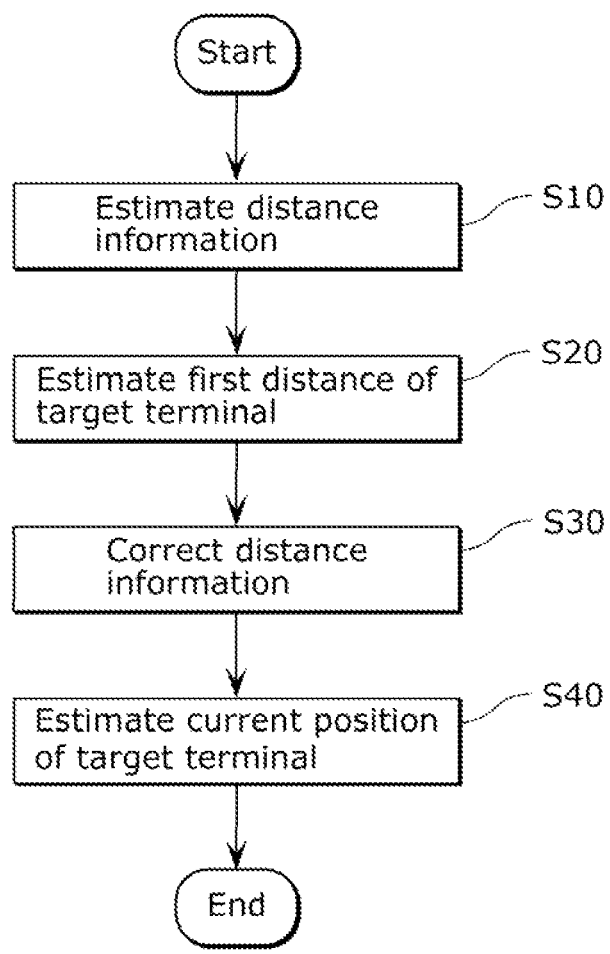
FIG. 24 is a flowchart showing an operation of the minimum structure of the position estimation device according to the present invention.

Furthermore, FIG. 24 is a flowchart showing an operation of the minimum structure of the position estimation device according to the present disclosure. The flowchart shown in FIG. 24 shows a position estimation method for estimating the current position of the wireless terminal by the minimum configuration of the position estimation device. Specifically, the minimum structure estimates distance information indicating a distance from each of the base stations communicating with the wireless terminal to the wireless terminal, using a receiving strength of a signal received by the wireless terminal from the base station (S10). Next, the minimum structure estimates a first position to be a current position of the wireless terminal using base station information indicating a position of the base station and the estimated distance information (S20). Next, the minimum structure corrects the distance information based on an acceleration and a direction of the wireless terminal detected at the estimated first position, the estimated first position, and the base station information (S30). Finally, the minimum structure of the position estimation device estimates a second position to be a current position of the wireless terminal using the base station information and the corrected distance information (S40).

Although each exemplary embodiment of the position estimation device according to an aspect of the present invention has been described above, the present invention is not limited to this embodiment. Other forms in which various modifications apparent to those skilled in the art are applied to the embodiments, or forms structured by combining constituent elements of different embodiments are included within the scope of the present invention, unless such changes and modifications depart from the scope of the present invention. The exemplified position estimation device may be modified as below. The following presents examples of the modifications.

(1) In the above-described embodiments, the base station management information 600 shown in FIG. 6 is stored in the storage unit beforehand. However, the present invention is not limited to this.

For example, the base station management information 600 may be stored in an external storage device, from which the target terminal obtains the base station management information through communication as necessary.

(2) In the above-described embodiments, the distance information or the receiving strength information is corrected by multiplying it by the correction factor. However, the method of correcting the distance information or the receiving strength information is not limited to such. For example, the distance information or the receiving strength information may be corrected by addition or subtraction using a table indicating the corresponding amount of correction.

(3) The above-described embodiments and variations may be partially combined.

For example, in Embodiment 2, the correction unit 1903 may: specify a positional relationship among the base station, the user, and the wireless terminal, using not only the determined placement state, the determined movement direction, the estimated first position but also the detected terminal posture of the target terminal; and correct the receiving strength according to the specified positional relationship.

Although it is described in Embodiment 1 and Embodiment 2 that the position estimation device is included in the target terminal, this is not an only example. The position estimation device may be included in a server of a cloud and the like connected the target terminal via a network.

(4) It is also possible to record on recording media or distribute via various communication paths and so on a control program including program codes which are written in a machine language or a high-level language to cause a processor of the position estimation device and various circuits connected to the processor to execute the distance estimation, correction, and other processes described in each of the above embodiments. Examples of the recording media include IC cards, hard disks, optical discs, flexible disks, ROMs, and flash memories. The distributed control program is provided for use by being stored in a memory and the like which can be read by the processor. As the processor executes the control program, each function described in each of the above embodiments is implemented. It is to be noted that rather than by directly executing the control program, the processor may execute the control program through compilation or by using an interpreter.

(5) Each functional structural element described in each of the above embodiments may be realized as a circuit which executes the function of the functional structural element or realized through execution of a program by one or more processors.

Stated differently, in each of the above non-limiting embodiments, each constituent element may be implemented by being configured with a dedicated hardware or being executed by a software program appropriate for each constituent element. The operation of switching to the whole screen display is not limited to double-tap, and may be a long press on the menu, a trigger (gesture) by rapid acceleration detection, a software or hardware dedicated button, a shared button, and the like. Each constituent element may be implemented by reading and executing the software program recorded on a hard disk or a recording medium such as a semiconductor memory, performed by a program execution unit such as a CPU or a processor.

Here the software which implements the image processing apparatus or the like in each of the above embodiments is a program described below. Specifically, this program causes a computer to execute: estimating, using a receiving strength of a signal received by the wireless terminal from each of a plurality of base stations communicating with the wireless terminal, distance information indicating a distance from the base station to the wireless terminal; estimating a first position to be a current position of the wireless terminal using base station information indicating a position of the base station and the estimated distance information; and correcting the distance information based on an acceleration and a direction of the wireless terminal at the estimated first position, the estimated first position, and the base station information wherein the estimating of a first position further includes estimating a second position to be a current position of the wireless terminal using the base station information and the corrected distance information.

Furthermore, the position estimation device according to an aspect of the present invention may be provided as a package of an integrated circuit such as IC and LSI. This package is incorporated into various devices for use, which allows the various devices to perform each function described in the embodiment.

It is to be noted that each functional block such as the distance estimation unit, each position estimation unit, the possible area calculation unit, and the correction unit is typically realized in the form of an LSI that is an integrated circuit. These LSIs may be manufactured as individual chips, or some or all of the LSIs may be integrated into one chip. Although the name used here is LSI, it is also called IC, system LSI, super LSI, or ultra LSI depending on the degree of integration. Furthermore, the means for circuit integration is not limited to the LSI, and a dedicated circuit and a general-purpose processor are also available. It is also acceptable to use: a field programmable gate array (FPGA) that is programmable after the LSI has been manufactured; and a reconfigurable processor in which connections and settings of circuit cells within the LSI are reconfigurable. Furthermore, if circuit integration technology that replaces LSI appears through progress in the semiconductor technology or other derivative technology, that circuit integration technology can be used for the integration of the functional blocks. Adaptation and so on of biotechnology is one such possibility.

(3-2. Supplementary Notes 2)

The following describes a structure of a position estimation device according to an aspect and its variations and advantageous effects.

(a) A position estimation device according to an aspect is a position estimation device which estimates a current position of a wireless terminal, the device including: a distance estimation unit configured to estimate, using a receiving strength of a signal received by the wireless terminal from each of a plurality of base stations communicating with the wireless terminal, distance information indicating a distance from the base station to the wireless terminal; a position estimation unit configured to estimate a first position to be a current position of the wireless terminal using base station information indicating a position of the base station and the estimated distance information; and a correction unit configured to correct the distance information based on an acceleration and a direction of the wireless terminal at the estimated first position, the estimated first position, and the base station information, wherein the position estimation unit is further configured to estimate a second position to be a current position of the wireless terminal using the base station information and the corrected distance information. Here, the position estimation device is included in the wireless terminal, and the position estimation device further includes a detection unit configured to detect the acceleration and the direction of the wireless terminal.

(b) The position estimation device according to the above (a) may further include a posture detection unit configured to detect a posture of the wireless terminal using an acceleration and a direction of the wireless terminal, and the correction unit may be configured to correct the distance information using the detected posture, the estimated first position, and the base station information.

With this configuration, the distance information is corrected according to the obstacle that attenuates the wireless signal, and thus it is possible to increase the accuracy of the estimation of the position of the wireless terminal. By using the accurate receiving strength for the position estimation, the position estimation device according to the present aspect can equally improve the accuracy of the estimated position information.

(c) The position estimation device according to the above (a) may further include a placement state determination unit configured to determine a placement state indicating where the wireless terminal at the estimated first position is placed on a user using an acceleration of the wireless terminal; and a movement direction determination unit configured to determine a movement direction of the wireless terminal at the estimated first position using the acceleration and a direction of the wireless terminal, and the correction unit may be configured to: specify a positional relationship among the base station, the user, and the wireless terminal, using the determined placement state, the determined movement direction, the estimated first position, and the base station information; and correct the distance information according to the specified positional relationship for example.

With this structure, whether or not the user (human body) is present between the base station and the wireless terminal can be determined, with it being possible to correct the distance information according to signal attenuation caused by human body interference.

(d) In the position estimation device according to the above (c), the correction unit may be configured to correct the distance information according to a frequency band used by the base station for communicating with the wireless terminal.

With this structure, regarding wireless signal attenuation that varies depending on frequency characteristics such as straightness and transmittance, the distance information corrected according to the frequency band used by the base station can be estimated.

(e) Furthermore, the position estimation device according to another aspect is a position estimation device which estimates a current position of a wireless terminal which includes: a storage unit configured to preliminarily store an electric field strength map in which a receiving strength of a signal received by the wireless terminal from each of a plurality of base stations communicating with the wireless terminal is recorded at predetermined space intervals; a measurement unit configured to measure a receiving strength of a signal received by the wireless terminal from the base station; a position estimation unit configured to estimate a first position to be a current position of the wireless terminal and at which the receiving strength is measured, using the receiving strength measured by the measurement unit and the electric field strength map stored in the storage unit; a placement state determination unit configured to determine a placement state indicating where the wireless terminal at the estimated first position is placed on a user using an acceleration of the wireless terminal; a movement direction determination unit configured to determine a movement direction of the wireless terminal at the estimated first position using the acceleration and a direction of the wireless terminal; and a correction unit configured to specify a positional relationship among the base station, the user, and the wireless terminal, using the determined placement state, the determined movement direction, and the estimated first position; and correct the receiving strength according to the specified positional relationship, wherein the position estimation unit is configured to estimate a second position to be a current position of the wireless terminal, using the corrected receiving strength and the stored electric field strength map. Here, the position estimation device is included in the wireless terminal, and the position estimation device further includes a detection unit configured to detect the acceleration and the direction of the wireless terminal for example.

With this structure, the terminal posture of the wireless terminal is calculated based on the acceleration information and the direction information, and the receiving strength is corrected according to the terminal posture. The accuracy of the receiving strength from the base station can be improved in this way. By using the accurate receiving strength for the position estimation, the position estimation device according to the present aspect can equally improve the accuracy of the estimated position information.

Moreover, with this structure, the position estimation is performed using the wireless strength map. This reduces processing time required for distance estimation and position estimation, contributing to faster position estimation.

INDUSTRIAL APPLICABILITY

The position estimation device according to the present disclosure can be used for various purposes including a mobile phone, a PHS, a watch, a wireless tag, and so on.

REFERENCE SIGNS LIST 100, 1900 Position estimation device
101 Sensor unit
102 Acceleration sensor
103 Geomagnetic sensor
104 Wireless processing unit
105, 1901 Control unit
106 Terminal information detection unit
107 Terminal posture detection unit
108 Movement direction detection unit
109 Placement state detection unit
110 Wireless strength measurement unit
111 Distance estimation unit
112, 1902 Position estimation unit
113, 1903 Correction unit
114, 1904 Storage unit
400 Model pattern information
600 Base station management information
500, 700, 900, 1100, 1700 Table
2000 Electric field strength map

The invention claimed is:

1. A position estimation device which estimates a current position of a wireless terminal, the device comprising:
  a distance estimation unit configured to estimate, using a receiving strength of a signal received by the wireless terminal from each of a plurality of base stations communicating with the wireless terminal, distance information indicating a distance from at least one base station of the plurality of base stations to the wireless terminal;
  a position estimation unit configured to estimate a first position to be the current position of the wireless terminal using base station information indicating a position of the at least one base station and the estimated distance information; and
  a correction unit configured to correct the distance information by: obtaining, using terminal posture information that is obtained by an acceleration sensor and a direction sensor of the wireless terminal and indicates an orientation of a surface of the wireless terminal at the estimated first position, surface orientation information on the orientation of the surface of the wireless terminal at the estimated first position as seen from the position of the at least one base station, the surface orientation information indicating which side of the wireless terminal faces the at least one base station; and correcting the distance from the at least one base station to the wireless terminal based on the obtained surface orientation information,
  wherein the position estimation unit is further configured to estimate a second position to be the current position of the wireless terminal using the base station information and the corrected distance information.

2. The position estimation device according to claim 1, wherein the position estimation device is included in the wireless terminal.

3. The position estimation device according to claim 1, further comprising
  a posture detection unit configured to detect a posture that is the orientation of the surface of the wireless terminal using an acceleration and a direction of the wireless terminal.

4. The position estimation device according to claim 3, wherein, when the detected posture, the estimated first position, and the base station information indicate that the posture of the wireless terminal with respect to one of the plurality of base stations is other than a front side posture, the correction unit is configured to correct a value of the distance information to be greater than when the posture of the wireless terminal with respect to the one of the plurality of base stations is the front side posture, the distance information being estimated as a distance from the one of the plurality of base stations to the wireless terminal.

5. The position estimation device according to claim 1, further comprising:
  a placement state determination unit configured to determine a placement state indicating where the wireless terminal at the estimated first position is placed on a user using an acceleration of the wireless terminal; and
  a movement direction determination unit configured to determine a movement direction of the wireless terminal at the estimated first position using the acceleration and a direction of the wireless terminal,
  wherein the correction unit is configured to: specify a positional relationship among the at least one base station, the user, and the wireless terminal, using the determined placement state, the determined movement direction, the estimated first position, and the base station information; and correct the distance information according to the specified positional relationship.

6. The position estimation device according to claim 5, wherein, when the specified positional relationship indicates that the user is present between one of the plurality of base stations and the wireless terminal, the correction unit is configured to correct a value of the distance information to be greater than when the user is not present between the one of the plurality of base stations and the wireless terminal, the distance information being estimated as a distance from the one of the plurality of base stations to the wireless terminal.

7. The position estimation device according to claim 5, wherein, when the specified positional relationship indicates that the user is present between one of the plurality of base stations and the wireless terminal and that the wireless terminal is placed in a breast pocket of a garment worn by the user, the correction unit is configured to correct a value of the distance information to be greater than when the wireless terminal is in a hand of the user, the distance information being estimated as a distance from another one of the plurality of base stations to the wireless terminal.

8. The position estimation device according to claim 1,
wherein the correction unit is configured to correct the distance information according to a frequency band used by the at least one base station for communicating with the wireless terminal.

9. The position estimation device according to claim 1,
wherein, when a distance from the estimated first position to the estimated second position is greater than or equal to a predetermined value, the position estimation device corrects the distance information again using the estimated second position as the estimated first position.

10. The position estimation device according to claim 9,
wherein, when the distance from the estimated first position to the estimated second position is greater than or equal to the predetermined value, the correction unit is configured to, using the estimated second position as the estimated first position, correct the distance information based on an acceleration and a direction of the wireless terminal at the estimated first position, the estimated first position, and the base station information, and
the position estimation unit is further configured to estimate the estimated second position to be the current position of the wireless terminal using the base station information and the corrected distance information.

11. A position estimation device which estimates a current position of a wireless terminal, the device comprising:
a storage unit configured to preliminarily store an electric field strength map in which a receiving strength of a signal received by the wireless terminal from each of a plurality of base stations communicating with the wireless terminal is recorded at predetermined space intervals;
a measurement unit configured to measure a receiving strength of a signal received by the wireless terminal from at least one base station of the plurality of base stations;
a position estimation unit configured to estimate a first position to be the current position of the wireless terminal and at which the receiving strength is measured, using the receiving strength measured by the measurement unit and the electric field strength map stored in the storage unit;
a placement state determination unit configured to determine a placement state indicating where the wireless terminal at the estimated first position is placed on a user using an acceleration of the wireless terminal;
a movement direction determination unit configured to determine a movement direction of the wireless terminal at the estimated first position using the acceleration and a direction of the wireless terminal; and
a correction unit configured to: obtain, using terminal posture information that is obtained by an acceleration sensor and a direction sensor of the wireless terminal and indicates an orientation of a surface of the wireless terminal at the estimated first position, surface orientation information on the orientation of the surface of the wireless terminal at the estimated first position as seen from the position of the at least one base station, the surface orientation information indicating which side of the wireless terminal faces the at least one base station; specify a positional relationship among the at least one base station, the user, and the wireless terminal, using the obtained surface orientation information, the determined placement state, the determined movement direction, and the estimated first position; and correct the receiving strength according to the orientation of the surface of the wireless terminal at the estimated first position and the specified positional relationship,
wherein the position estimation unit is configured to estimate a second position to be the current position of the wireless terminal, using the corrected receiving strength and the stored electric field strength map.

12. The position estimation device according to claim 11,
wherein the position estimation device is included in the wireless terminal, and
the position estimation device further comprises a detection unit configured to detect the acceleration and the direction of the wireless terminal.

13. The position estimation device according to claim 11, further comprising
a posture detection unit configured to detect the terminal posture information of the wireless terminal using the acceleration sensor and the direction sensor of the wireless terminal.

14. A position estimation method for estimating a current position of a wireless terminal, the method being performed by the wireless terminal, the method comprising:
estimating, using a receiving strength of a signal received by the wireless terminal from each of a plurality of base stations communicating with the wireless terminal, distance information indicating a distance from at least one base station of the plurality of base stations to the wireless terminal;
estimating a first position to be the current position of the wireless terminal using base station information indicating a position of the at least one base station and the estimated distance information; and
correcting the distance information by: obtaining, using terminal posture information that is obtained by an acceleration sensor and a direction sensor of the wireless terminal and indicates an orientation of a surface of the wireless terminal at the estimated first position, surface orientation information on the orientation of the surface of the wireless terminal at the estimated first position as seen from the position of the at least one base station, the surface orientation information indicating which side of the wireless terminal faces the at least one base station; and correcting the distance from the at least one base station to the wireless terminal based on the obtained surface orientation information,
wherein the estimating of a first position further includes estimating a second position to be the current position of the wireless terminal using the base station information and the corrected distance information.

15. A non-transitory computer-readable recording medium on which a program for causing a computer to execute position estimation processing for estimating a current position of a wireless terminal is recorded, the position estimation processing being executed in the wireless terminal, the position estimation processing comprising:
estimating, using a receiving strength of a signal received by the wireless terminal from each of a plurality of base stations communicating with the wireless terminal, distance information indicating a distance from at least one base station of the plurality of base stations to the wireless terminal;
estimating a first position to be the current position of the wireless terminal using base station information indicating a position of the at least one base station and the estimated distance information; and
correcting the distance information by: obtaining, using terminal posture information that is obtained by an acceleration sensor and a direction sensor of the wireless terminal and indicates an orientation of a surface of the wireless terminal at the estimated first position, surface orientation information on the orientation of the surface of the wireless terminal at the estimated first position as seen from the position of the at least one base station, the surface orientation information indicating which side of the wireless terminal faces the at least one base station; and correcting the distance from the at least one base station to the wireless terminal based on the obtained surface orientation information, wherein the estimating of a first position further includes estimating a second position to be the current position of the wireless terminal using the base station information and the corrected distance information.

16. An integrated circuit which estimates a current position of a wireless terminal, the integrated circuit being included in the wireless terminal, the integrated circuit comprising:

a distance estimation unit configured to estimate, using a receiving strength of a signal received by the wireless terminal from each of a plurality of base stations communicating with the wireless terminal, distance information indicating a distance from at least one base station of the plurality of base stations to the wireless terminal;

a position estimation unit configured to estimate a first position to be the current position of the wireless terminal using base station information indicating a position of the at least one base station and the estimated distance information; and a correction unit configured to correct the distance information by: obtaining, using terminal posture information that is obtained by an acceleration sensor and a direction sensor of the wireless terminal and indicates an orientation of a surface of the wireless terminal at the estimated first position, surface orientation information on the orientation of the surface of the wireless terminal at the estimated first position as seen from the position of the at least one base station, the surface orientation information indicating which side of the wireless terminal faces the at least one base station; and correcting the distance from the at least one base station to the wireless terminal based on the obtained surface orientation information, wherein the position estimation unit is further configured to estimate a second position to be the current position of the wireless terminal using the base station information and the corrected distance information.

* * * * *